US010850305B2

(12) United States Patent
Loginov et al.

(10) Patent No.: US 10,850,305 B2
(45) Date of Patent: Dec. 1, 2020

(54) MAGNETIC ASSEMBLIES AND PROCESSES FOR PRODUCING OPTICAL EFFECT LAYERS COMPRISING ORIENTED NON-SPHERICAL MAGNETIC OR MAGNETIZABLE PIGMENT PARTICLES

(71) Applicant: SICPA HOLDING SA, Prilly (CH)

(72) Inventors: Evgeny Loginov, Renens (CH); Mathieu Schmid, Lausanne (CH); Claude-Alain Despland, Prilly (CN)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 15/768,337

(22) PCT Filed: Oct. 11, 2016

(86) PCT No.: PCT/EP2016/074323
§ 371 (c)(1),
(2) Date: Apr. 13, 2018

(87) PCT Pub. No.: WO2017/064052
PCT Pub. Date: Apr. 20, 2017

(65) Prior Publication Data
US 2018/0326453 A1    Nov. 15, 2018

(30) Foreign Application Priority Data

Oct. 15, 2015 (EP) .................................... 15189955

(51) Int. Cl.
*B05D 5/06* (2006.01)
*B05D 3/06* (2006.01)
(Continued)

(52) U.S. Cl.
CPC ............. *B05D 5/061* (2013.01); *B05D 3/067* (2013.01); *B05D 3/20* (2013.01); *B05D 3/207* (2013.01);
(Continued)

(58) Field of Classification Search
CPC .......... B05D 5/06; B05D 5/065; B05D 5/066; B05D 5/061; B05D 5/067; B05D 5/063;
(Continued)

(56) References Cited

U.S. PATENT DOCUMENTS

| 2,570,856 A | 10/1951 | Carlton et al. |
| 3,676,273 A | 7/1972 | Graves |

(Continued)

FOREIGN PATENT DOCUMENTS

| CN | 102529326 | 8/2014 |
| EP | 0686675 | 2/1998 |

(Continued)

OTHER PUBLICATIONS

Chemistry & Technology of UV & EB Formulation for Coatings, Inks & Paints, vol. III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.
(Continued)

*Primary Examiner* — Tabassom Tadayyon Eslami
(74) *Attorney, Agent, or Firm* — Muncy, Geissler, Olds & Lowe, P.C.

(57) ABSTRACT

The present invention relates to the field of magnetic assemblies and processes for producing optical effect layers (OEL) comprising magnetically oriented non-spherical magnetic or magnetizable pigment particles on a substrate. In particular, the present invention relates magnetic assemblies and processes for producing said OELs as anti-counterfeit means on security documents or security articles or for decorative purposes.

13 Claims, 4 Drawing Sheets

(51) Int. Cl.
    *B41M 3/14*    (2006.01)
    *C09C 1/00*    (2006.01)
    *B42D 25/369*  (2014.01)
    *B42D 25/364*  (2014.01)
    *B05D 3/00*    (2006.01)
    *B42D 25/21*   (2014.01)

(52) U.S. Cl.
    CPC ............. *B41M 3/14* (2013.01); *B42D 25/21* (2014.10); *B42D 25/364* (2014.10); *B42D 25/369* (2014.10); *C09C 1/00* (2013.01); *C01P 2006/42* (2013.01)

(58) Field of Classification Search
    CPC ... B05D 5/65; B05D 5/61; B05D 5/63; B05D 5/66; B42D 25/29; B42D 25/369; B42D 25/378; B41M 3/14
    USPC ....... 427/127, 128, 129, 130, 131, 132, 550, 427/547, 598
    See application file for complete search history.

(56)          References Cited

U.S. PATENT DOCUMENTS

| 3,791,864 | A | 2/1974 | Steingroever |
| 4,838,648 | A | 6/1989 | Phillips et al. |
| 5,364,689 | A | 11/1994 | Kashiwagi et al. |
| 5,630,877 | A | 5/1997 | Kashiwagi et al. |
| 6,410,130 | B1 | 6/2002 | Schuhmacher et al. |
| 6,531,221 | B1 | 3/2003 | Schuhmacher et al. |
| 6,582,781 | B1 | 6/2003 | Schuhmacher et al. |
| 6,838,166 | B2 | 1/2005 | Phillips et al. |
| 7,047,883 | B2 | 5/2006 | Raksha et al. |
| 7,955,695 | B2 | 6/2011 | Argoitia |
| 8,343,615 | B2 | 1/2013 | Raksha et al. |
| 2006/0097515 | A1* | 5/2006 | Raksha ................ B05D 3/207 283/91 |
| 2007/0172261 | A1 | 7/2007 | Raksha et al. |
| 2010/0040799 | A1* | 2/2010 | Raksha ................ B05D 5/063 427/550 |
| 2010/0040845 | A1* | 2/2010 | Schmid ................ B05D 3/207 428/207 |
| 2012/0162344 | A1* | 6/2012 | Raksha ................ B05D 3/207 347/237 |
| 2013/0084411 | A1 | 4/2013 | Raksha et al. |
| 2014/0108303 | A1 | 4/2014 | Cheyer et al. |
| 2014/0108404 | A1 | 4/2014 | Chen et al. |

FOREIGN PATENT DOCUMENTS

| EP | 1666546 | | 6/2006 |
| EP | 1710756 | | 10/2006 |
| EP | 2157141 | | 2/2010 |
| EP | 1819525 | | 3/2010 |
| EP | 2306222 | | 4/2011 |
| EP | 2325677 | | 5/2011 |
| EP | 2402401 | | 1/2012 |
| WO | 2002073250 | | 9/2002 |
| WO | 2003000801 | | 1/2003 |
| WO | 2005002866 | | 1/2005 |
| WO | 2006063926 | | 6/2006 |
| WO | 2006069218 | | 6/2006 |
| WO | 2007131833 | | 11/2007 |
| WO | 2008046702 | | 4/2008 |
| WO | 2011092502 | | 8/2011 |
| WO | 2014/108303 | * | 7/2014 |
| WO | 2014108303 | | 7/2014 |
| WO | 2014108404 | | 7/2014 |
| WO | 2015082344 | | 6/2015 |
| WO | 2015086257 | | 6/2015 |

OTHER PUBLICATIONS

Z.Q. Zhu and D. Howe (Halbach permanent magnet machines and applications: a review, IEE. Proc. Electric Power Appl., 2001, 148, p. 299-308).

Chemistry & Technology of UV & EB Formulation for Coatings, Inks & Paints, vol. IV, Formulation, by C. Lowe, G. Webster, S. Kessel and I. McDonald, 1996 by John Wiley & Sons in association with SITA Technology Limited.

DIN 5036-3 "Radiometric and photometric properties of materials Methods of measurement for photometric and spectral radiometric characteristic factors" (Nov. 1979). 27 pages.

International Search Report and Written Opinion issued with respect to application No. PCT/EP2016/074323.

Japanese Office Action in counterpart Japanese Application No. 2018-519035 dated Mar. 25, 2020 (and English language translation of the Office Action).

* cited by examiner

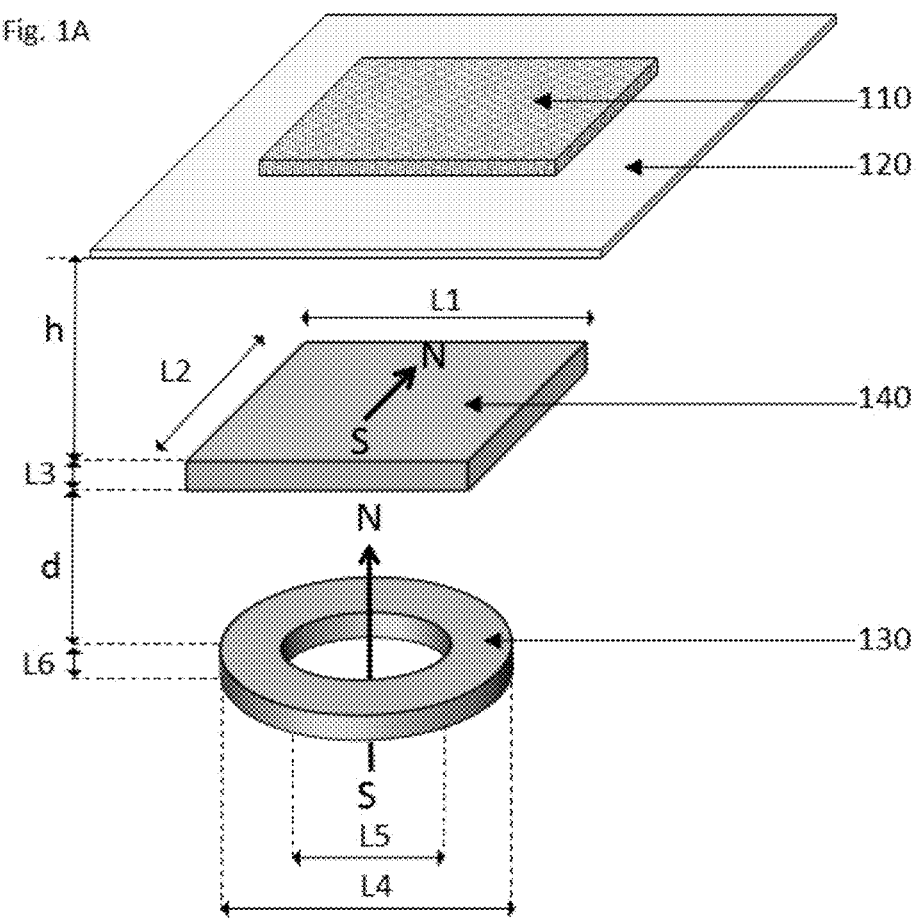

-30°     -20°     -10°     0°     10°     20°

-10°  0°  10°  20°  30°  40°

-30°  -20°  -10°  0°  10°  20°

MAGNETIC ASSEMBLIES AND PROCESSES FOR PRODUCING OPTICAL EFFECT LAYERS COMPRISING ORIENTED NON-SPHERICAL MAGNETIC OR MAGNETIZABLE PIGMENT PARTICLES

FIELD OF THE INVENTION

The present invention relates to the field of the protection of value documents and value commercial goods against counterfeit and illegal reproduction. In particular, the present invention relates to optical effect layers (OEL) showing a viewing-angle dependent optical effect, magnetic assemblies and processes for producing said OEL, as well as uses of said optical effect layers as anti-counterfeit means on documents.

BACKGROUND OF THE INVENTION

The use of inks, coating compositions, coatings, or layers, containing magnetic or magnetizable pigment particles, in particular non-spherical optically variable magnetic or magnetizable pigment particles, for the production of security elements and security documents is known in the art.

Security features, e.g. for security documents, can be classified into "covert" and "overt" security features. The protection provided by covert security features relies on the concept that such features are hidden, typically requiring specialized equipment and knowledge for their detection, whereas "overt" security features are easily detectable with the unaided human senses, e.g. such features may be visible and/or detectable via the tactile senses while still being difficult to produce and/or to copy. However, the effectiveness of overt security features depends to a great extent on their easy recognition as a security feature, because users will only then actually perform a security check based on such security feature if they are aware of its existence and nature.

Coatings or layers comprising oriented magnetic or magnetizable pigment particles are disclosed for example in U.S. Pat. Nos. 2,570,856; 3,676,273; 3,791,864; 5,630,877 and 5,364,689. Magnetic or magnetizable pigment particles in coatings allow for the production of magnetically induced images, designs and/or patterns through the application of a corresponding magnetic field, causing a local orientation of the magnetic or magnetizable pigment particles in the unhardened coating, followed by hardening the latter. This results in specific optical effects, i.e. fixed magnetically induced images, designs or patterns which are highly resistant to counterfeit. The security elements based on oriented magnetic or magnetizable pigments particles can only be produced by having access to both the magnetic or magnetizable pigment particles or a corresponding ink or composition comprising said particles, and the particular technology employed to apply said ink or composition and to orient said pigment particles in the applied ink or composition.

For example, U.S. Pat. No. 7,047,883 discloses an apparatus and a method for producing optical effect layers (OELs), obtained by orienting magnetic or magnetizable optically variable pigment flakes in a coating composition; the disclosed apparatus consists in specific arrangements of permanent magnets placed under the substrate carrying said coating composition. According to U.S. Pat. No. 7,047,883, a first portion of the magnetic or magnetizable optically variable pigment flakes in the OEL is oriented such as to reflect light in a first direction and a second portion adjacent to the first one is aligned such as to reflect light in a second direction, producing a visual "flip-flop" effect upon tilting the OEL.

WO 2006/069218 A2 discloses a substrate comprising an OEL comprising optically variable magnetic or magnetizable pigment flakes, oriented in such a way that a bar appears to move when said OEL is tilted ("rolling bar"). According to WO 2006/069218 A2, specific arrangements of permanent magnets under the substrate carrying the optically variable magnetic or magnetizable pigment flakes serve to orient said flakes such as to imitate a curved surface.

U.S. Pat. No. 7,955,695 relates to an OEL wherein so-called grated magnetic or magnetizable pigment particles are oriented mainly vertical to the substrate surface, such as to produce visual effects imitating a butterfly's wing with strong interference colors. Here again, specific arrangements of permanent magnets under the substrate carrying the coating composition serve to orient the pigment particles.

EP 1 819 525 B1 discloses a security element having OEL which appears transparent at certain angles of view, thus giving visual access to underlying information, whilst staying opaque at other viewing angles. To obtain this effect, known as "Venetian blind effect", specific arrangements of permanent magnets under the substrate orient the optically variable magnetizable or magnetic pigment flakes at a predetermined angle relatively to the substrate surface.

Moving-ring effects have been developed as efficient security elements. Moving-ring effects consist of optically illusive images of objects such as funnels, cones, bowls, circles, ellipses, and hemispheres that appear to move in any x-y direction depending upon the angle of tilt of said optical effect layer. Methods for producing moving-ring effects are disclosed for example in EP 1 710 756 A1, U.S. Pat. No. 8,343,615, EP 2 306 222 A1, EP 2 325 677 A2, and US 2013/084411.

WO 2011/092502 A2 discloses an apparatus for producing moving-ring images displaying an apparently moving ring with changing viewing angle. The disclosed moving-ring images might be obtained or produced by using a device allowing the orientation of magnetic or magnetizable particles with the help of a magnetic field produced by the combination of a soft magnetizable sheet and a spherical magnet having its North-South axis perpendicular to the plane of the coating layer and disposed below said soft magnetizable sheet.

The prior art moving ring images are generally produced by alignment of the magnetic or magnetizable particles according to the magnetic field of only one rotating or static magnet. Since the field lines of only one magnet generally bend relatively softly, i.e. have a low curvature, also the change in orientation of the magnetic or magnetizable particles is relatively soft over the surface of the OEL. Further, the intensity of the magnetic field decreases rapidly with increasing distance from the magnet when only a single magnet is used. This makes it difficult to obtain a highly dynamic and well-defined feature through orientation of the magnetic or magnetizable particles, and may result in visual effects that exhibit blurred ring edges.

WO 2014/108404 A2 discloses optical effect layers (OEL) comprising a plurality of magnetically oriented non-spherical magnetic or magnetizable particles, which are dispersed in a coating. The specific magnetic orientation pattern of the disclosed OELs provides a viewer the optical effect or impression of a loop-shaped body that moves upon tilting of the OEL. Moreover, WO 2014/108404 A2 discloses OELs further exhibiting an optical effect or impression of a protrusion in the central area of the loop-shaped body, said protrusion being caused by a reflection zone in the central area surrounded by the loop-shaped body. The disclosed protrusion provides the impression of a three-dimensional object, such as a half-sphere, present in the central area surrounded by the loop-shape body.

WO 2014/108303 A1 discloses optical effect layers (OEL) comprising a plurality of magnetically oriented non-spherical magnetic or magnetizable particles, which are dispersed in a coating. The specific magnetic orientation pattern of the disclosed OELs provides a viewer the optical effect or impression of a plurality of nested loop-shaped bodies surrounding one common central area, wherein said bodies exhibit a viewing-angle dependent apparent motion. Moreover, WO 2014/108303 A1 discloses OELs further comprising a protrusion which is surrounded by the innermost loop-shaped body and partly fills the central area defined thereby. The disclosed protrusion provides the illusion of a three-dimensional object, such as a half-sphere, present in the central area.

A need remains for security features displaying an eye-catching dynamic loop-shaped effect on a substrate in good quality, which can be easily verified regardless of the orientation of the security document, is difficult to produce on a mass-scale with the equipment available to a counterfeiter, and which can be provided in great number of possible shapes and forms.

SUMMARY OF THE INVENTION

Accordingly, it is an object of the present invention to overcome the deficiencies of the prior art as discussed above.

In a first aspect, the present invention provides a process for producing an optical effect layer (OEL) on a substrate and optical effect layers (OEL) obtained thereof, said process comprising the steps of:
a) applying on a substrate surface a radiation curable coating composition comprising non-spherical magnetic or magnetizable pigment particles, said radiation curable coating composition being in a first state,
b) exposing the radiation curable coating composition to a magnetic field of a magnetic assembly comprising
   i) a loop-shaped magnetic-field generating device being either a single loop-shaped dipole magnet having a North-South magnetic axis substantially perpendicular to the substrate surface or a combination of two or more dipole magnets disposed in a loop-shaped arrangement and having a resulting North-South magnetic axis substantially perpendicular to the substrate surface, and
   ii) a magnetic-field generating device being either a single bar dipole magnet having a North-South magnetic axis substantially parallel to the substrate surface or a combination of two or more bar dipole magnets having a resulting North-South magnetic axis substantially parallel to the substrate surface,
   so as to orient at least a part of the non-spherical magnetic or magnetizable pigment particles, and
c) at least partially curing the radiation curable coating composition of step b) to a second state so as to fix the non-spherical magnetic or magnetizable pigment particles in their adopted positions and orientations,
wherein the optical effect layer provides an optical impression of a loop-shaped body having a size that varies upon tilting the optical effect layer.

In a further aspect, the present invention provides an optical effect layer (OEL) prepared by the process recited above.

In a further aspect, a use of the optical effect layer (OEL) is provided for the protection of a security document against counterfeiting or fraud or for a decorative application.

In a further aspect, the present invention provides a security document or a decorative element or object comprising one or more optical effect layer such as those described herein.

In a further aspect, the present invention provides a magnetic assembly for producing the optical effect layer (OEL) described herein on a substrate such as those described herein, said OEL comprising oriented non-spherical magnetic or magnetizable pigment particles in a cured radiation curable coating composition, the magnetic assembly comprising:
a) a loop-shaped magnetic-field generating device being either a single loop-shaped dipole magnet having a North-South magnetic axis substantially perpendicular to the substrate surface or a combination of two or more dipole magnets disposed in a loop-shaped arrangement and having a resulting North-South magnetic axis substantially perpendicular to the substrate surface, and
b) a magnetic-field generating device being either a single bar dipole magnet having a North-South magnetic axis substantially parallel to the substrate surface or a combination of two or more bar dipole magnets having a resulting North-South magnetic axis substantially parallel to the substrate surface.

The loop-shaped magnetic field generating device and the magnetic field generating device may be arranged one on top of the other.

The magnetic field produced by the loop shaped magnetic-field generating device and the magnetic field produced by the magnetic field generating device may interact so that the resulting magnetic field of the magnetic assembly is able to orient non-spherical magnetic or magnetizable pigment particles in an as yet uncured radiation curable coating composition on the substrate, which are disposed in the magnetic field of the magnetic assembly to produce an optical impression of the optical effect layer of a loop-shaped body having a size that varies upon tilting the optical effect layer.

The optical impression may be such that when the substrate is tilted in one direction from a perpendicular viewing angle, the loop-shaped body appears to enlarge and when the substrate is tilted from the perpendicular viewing angle in an opposed direction to the first direction, the loop shaped body appears to shrink.

In a further aspect, the present invention provides a use of the magnetic assembly described herein for producing the optical effect layer (OEL) described herein on a substrate such as those described herein.

In a further aspect, the present invention provides a assembly comprising a rotating magnetic cylinder comprising at least one of the magnetic assembly described herein or a flatbed printing unit comprising at least one of the magnetic assembly described herein.

In a further aspect, the present invention provides a use of the printing assembly recited described herein for producing the optical effect layer (OEL) described herein on a substrate such as those described herein.

BRIEF DESCRIPTION OF DRAWINGS

FIG. 1A schematically illustrates a magnetic assembly comprising a loop-shaped magnetic-field generating device (130), in particular a ring-shaped dipole magnet, and a magnetic-field generating device (140) suitable for producing an optical effect layer (110) on a substrate (120).

DETAILED DESCRIPTION

Definitions

Figure 1B:
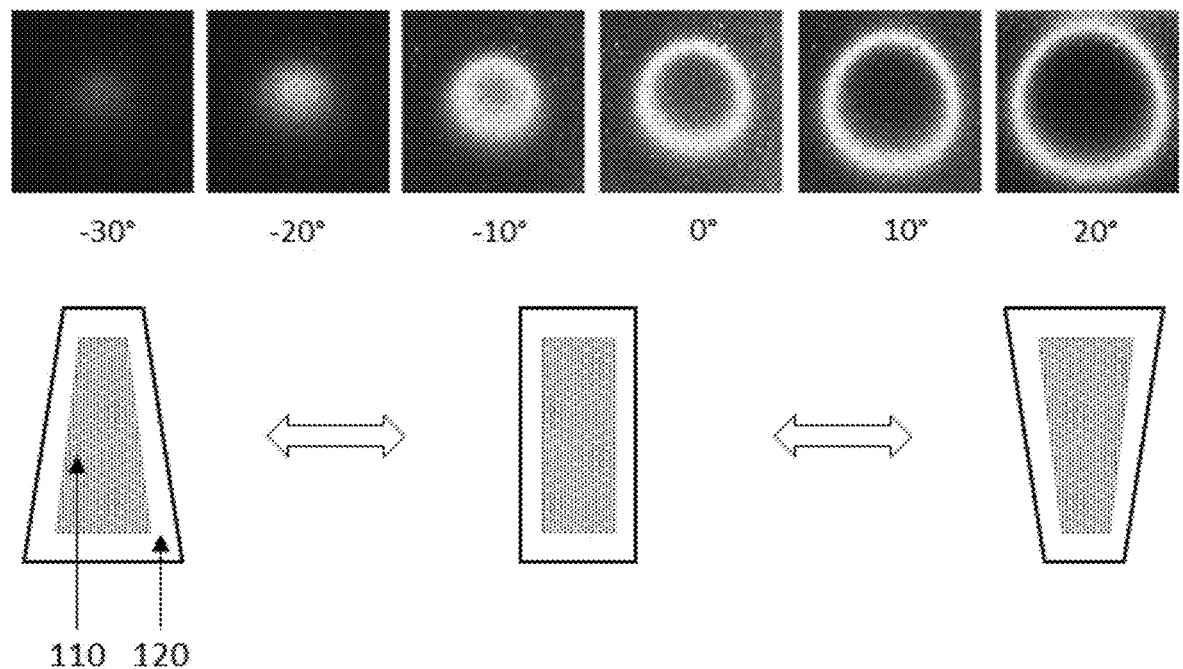
FIG. 1B shows pictures of an OEL obtained by using the magnetic assembly illustrated in FIG. 1A, as viewed under different viewing angles.

The following definitions are to be used to interpret the meaning of the terms discussed in the description and recited in the claims.

As used herein, the indefinite article "a" indicates one as well as more than one and does not necessarily limit its referent noun to the singular.

As used herein, the term "about" means that the amount or value in question may be the specific value designated or some other value in its neighborhood. Generally, the term "about" denoting a certain value is intended to denote a range within ±5% of the value. As one example, the phrase "about 100" denotes a range of 100±5, i.e. the range from 95 to 105. Generally, when the term "about" is used, it can be expected that similar results or effects according to the invention can be obtained within a range of ±5% of the indicated value.

The term "substantially parallel" refers to deviating not more than 10° from parallel alignment and the term "substantially perpendicular" refers to deviating not more than 10° from perpendicular alignment.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

The term "comprising" as used herein is intended to be non-exclusive and open-ended. Thus, for instance a fountain solution comprising a compound A may include other compounds besides A. However, the term "comprising" also covers, as a particular embodiment thereof, the more restrictive meanings of "consisting essentially of" and "consisting of", so that for instance "a fountain solution comprising A, B and optionally C" may also (essentially) consist of A and B, or (essentially) consist of A, B and C.

The term "coating composition" refers to any composition which is capable of forming an optical effect layer (OEL) of the present invention on a solid substrate and which can be applied preferentially but not exclusively by a printing method. The coating composition comprises at least a plurality of non-spherical magnetic or magnetizable particles and a binder.

The term "optical effect layer (OEL)" as used herein denotes a layer that comprises at least a plurality of magnetically oriented non-spherical magnetic or magnetizable particles and a binder, wherein the orientation of the non-spherical magnetic or magnetizable particles is fixed or frozen (fixed/frozen) within the binder.

The term "curing" is used to denote a process wherein an increased viscosity of a coating composition in reaction to a stimulus to convert a material into a state, i.e. a hardened or solid state, where the non-spherical magnetic or magnetizable pigment particles are fixed/frozen in their current positions and orientations and can no longer move nor rotate.

Where the present description refers to "preferred" embodiments/features, combinations of these "preferred" embodiments/features shall also be deemed as disclosed as long as this combination of "preferred" embodiments/features is technically meaningful.

As used herein, the term "at least" is meant to define one or more than one, for example one or two or three.

The term "security document" refers to a document which is usually protected against counterfeit or fraud by at least one security feature. Examples of security documents include without limitation value documents and value commercial goods.

The term "security feature" is used to denote an image, pattern or graphic element that can be used for authentication purposes.

The term "loop-shaped body" denotes that the non-spherical magnetic or magnetizable particles are provided such that the OEL confers to the viewer the visual impression of a closed body re-combining with itself, forming a closed loop-shaped body surrounding one central dark area. The "loop-shaped body" can have round, oval, ellipsoid, square, triangular, rectangular or any polygonal shape. Examples of loop-shapes include a ring or circle, a rectangle or square (with or without rounded corners), a triangle (with or without rounded corners), a (regular or irregular) pentagon (with or without rounded corners), a (regular or irregular) hexagon (with or without rounded corners), a (regular or irregular) heptagon (with or without rounded corners), an (regular or irregular) octagon (with or without rounded corners), any polygonal shape (with or without rounded corners), etc. In the present invention, the optical impression of a loop-shaped body is formed by the orientation of the non-spherical magnetic or magnetizable particles.

The present invention provides methods for producing an optical effect layer (OEL) on a substrate and optical effect layers (OELs) obtained thereof, wherein said methods comprise a step of applying on the substrate surface a radiation curable coating composition comprising non-spherical magnetic or magnetizable pigment particles, said radiation curable coating composition being in a first state. The so-obtained optical effect layers (OELs) provides a viewer the optical impression of a loop-shaped body having a size that varies upon tilting the substrate comprising the optical effect layer.

The applying step a) described herein is preferably carried out by a printing process preferably selected from the group consisting of screen printing, rotogravure printing, flexography printing, inkjet printing and intaglio printing (also referred in the art as engraved copper plate printing and engraved steel die printing), more preferably selected from the group consisting of screen printing, rotogravure printing and flexography printing.

Subsequently to, partially simultaneously with or simultaneously with the application of the radiation curable coating composition described herein on the substrate surface described herein, at least a part of the non-spherical magnetic or magnetizable pigment particles are oriented by exposing the radiation curable coating composition to the magnetic field of a magnetic assembly, so as to align at least part of the non-spherical magnetic or magnetizable pigment particles along the magnetic field lines generated by the magnetic assembly.

Subsequently to or partially simultaneously with the steps of orienting/aligning at least a part of the non-spherical magnetic or magnetizable pigment particles by applying the magnetic field described herein, the orientation of the non-spherical magnetic or magnetizable pigment particles is fixed or frozen. The radiation curable coating composition must thus noteworthy have a first state, i.e. a liquid or pasty state, wherein the radiation curable coating composition is wet or soft enough, so that the non-spherical magnetic or magnetizable pigment particles dispersed in the radiation curable coating composition are freely movable, rotatable and/or orientable upon exposure to the magnetic field, and a second cured (e.g. solid) state, wherein the non-spherical magnetic or magnetizable pigment particles are fixed or frozen in their respective positions and orientations.

Accordingly, the methods for producing an optical effect layer (OEL) on a substrate described herein comprises a step c) of at least partially curing the radiation curable coating composition of step b) to a second state so as to fix the non-spherical magnetic or magnetizable pigment particles in their adopted positions and orientations. The step of at least partially curing the radiation curable coating composition may be carried out subsequently to or partially simultaneously with the step of orienting/aligning at least a part of the non-spherical magnetic or magnetizable pigment particles by applying the magnetic field described herein (step b)). Preferably, the step of at least partially curing the radiation curable coating composition is carried out partially simultaneously with the step of orienting/aligning at least a part of the non-spherical magnetic or magnetizable pigment particles by applying the magnetic field described herein (step b)). By "partially simultaneously", it is meant that both steps are partly performed simultaneously, i.e. the times of performing each of the steps partially overlap. In the context described herein, when curing is performed partially simultaneously with the orientation step b), it must be understood that curing becomes effective after the orientation so that the pigment particles orient before the complete or partial hardening of the OEL.

The first and second states of the radiation curable coating composition are provided by using a certain type of radiation curable coating composition. For example, the components of the radiation curable coating composition other than the non-spherical magnetic or magnetizable pigment particles may take the form of an ink or radiation curable coating composition such as those which are used in security applications, e.g. for banknote printing. The aforementioned first and second states are provided by using a material that shows an increase in viscosity in reaction to an exposure to an electromagnetic radiation. That is, when the fluid binder material is cured or solidified, said binder material converts into the second state where the non-spherical magnetic or magnetizable pigment particles are fixed in their current positions and orientations and can no longer move nor rotate within the binder material.

As known to those skilled in the art, ingredients comprised in a radiation curable coating composition to be applied onto a surface such as a substrate and the physical properties of said radiation curable coating composition must fulfil the requirements of the process used to transfer the radiation curable coating composition to the substrate surface. Consequently, the binder material comprised in the radiation curable coating composition described herein is typically chosen among those known in the art and depends on the coating or printing process used to apply the radiation curable coating composition and the chosen radiation curing process.

In the optical effect layers (OELs) described herein, the non-spherical magnetic or magnetizable pigment particles described herein are dispersed in the radiation curable coating composition comprising a cured binder material that fixes/freezes the orientation of the non-spherical magnetic or magnetizable pigment particles. The cured binder material is at least partially transparent to electromagnetic radiation of a range of wavelengths comprised between 200 nm and 2500 nm. The binder material is thus, at least in its cured or solid state (also referred to as second state herein), at least partially transparent to electromagnetic radiation of a range of wavelengths comprised between 200 nm and 2500 nm, i.e. within the wavelength range which is typically referred to as the "optical spectrum" and which comprises infrared, visible and UV portions of the electromagnetic spectrum, such that the particles contained in the binder material in its cured or solid state and their orientation-dependent reflectivity can be perceived through the binder material. Preferably, the cured binder material is at least partially transparent to electromagnetic radiation of a range of wavelengths comprised between 200 nm and 800 nm, more preferably comprised between 400 nm and 700 nm. Herein, the term "transparent" denotes that the transmission of electromagnetic radiation through a layer of 20 µm of the cured binder material as present in the OEL (not including the platelet-shaped magnetic or magnetizable pigment particles, but all other optional components of the OEL in case such components are present) is at least 50%, more preferably at least 60%, even more preferably at least 70%, at the wavelength (s) concerned. This can be determined for example by measuring the transmittance of a test piece of the cured binder material (not including the platelet-shaped magnetic or magnetizable pigment particles) in accordance with well-established test methods, e.g. DIN 5036-3 (1979-11). If the OEL serves as a covert security feature, then typically technical means will be necessary to detect the (complete) optical effect generated by the OEL under respective illuminating conditions comprising the selected non-visible wavelength; said detection requiring that the wavelength of incident radiation is selected outside the visible range, e.g. in the near UV-range. In this case, it is preferable that the OEL comprises luminescent pigment particles that show luminescence in response to the selected wavelength outside the visible spectrum contained in the incident radiation. The infrared, visible and UV portions of the electromagnetic spectrum approximately correspond to the wavelength ranges between 700-2500 nm, 400-700 nm, and 200-400 nm respectively.

As mentioned hereabove, the radiation curable coating composition described herein depends on the coating or printing process used to apply said radiation curable coating composition and the chosen curing process. Preferably, curing of the radiation curable coating composition involves a chemical reaction which is not reversed by a simple temperature increase (e.g. up to 80° C.) that may occur during a typical use of an article comprising the OEL described herein. The term "curing" or "curable" refers to processes including the chemical reaction, crosslinking or polymerization of at least one component in the applied radiation curable coating composition in such a manner that it turns into a polymeric material having a greater molecular weight than the starting substances. Radiation curing advantageously leads to an instantaneous increase in viscosity of the radiation curable coating composition after exposure to the curing irradiation, thus preventing any further movement of the pigment particles and in consequence any loss of information after the magnetic orientation step. Preferably, the curing step (step c)) is carried out by radiation curing including UV-visible light radiation curing or by E-beam radiation curing, more preferably by UV-Vis light radiation curing.

Therefore, suitable radiation curable coating compositions for the present invention include radiation curable compositions that may be cured by UV-visible light radiation (hereafter referred as UV-Vis radiation curable) or by E-beam radiation (hereafter referred as EB). Radiation curable compositions are known in the art and can be found in standard textbooks such as the series "Chemistry & Technology of UV & EB Formulation for Coatings, Inks & Paints", Volume IV, Formulation, by C. Lowe, G. Webster, S. Kessel and I. McDonald, 1996 by John Wiley & Sons in association with SITA Technology Limited. According to one particularly preferred embodiment of the present invention, the radiation curable coating composition described herein is a UV-Vis radiation curable coating composition.

Preferably, the UV-Vis radiation curable coating composition comprises one or more compounds selected from the group consisting of radically curable compounds and cationically curable compounds. The UV-Vis radiation curable coating composition described herein may be a hybrid system and comprises a mixture of one or more cationically curable compounds and one or more radically curable compounds. Cationically curable compounds are cured by cationic mechanisms typically including the activation by radiation of one or more photoinitiators which liberate cationic species, such as acids, which in turn initiate the curing so as to react and/or cross-link the monomers and/or oligomers to thereby cure the radiation curable coating composition. Radically curable compounds are cured by free radical mechanisms typically including the activation by radiation of one or more photoinitiators, thereby generating radicals which in turn initiate the polymerization so as to cure the radiation curable coating composition. Depending on the monomers, oligomers or prepolymers used to prepare the binder comprised in the UV-Vis radiation curable coating compositions described herein, different photoinitiators might be used. Suitable examples of free radical photoinitiators are known to those skilled in the art and include without limitation acetophenones, benzophenones, benzyldimethyl ketals, alpha-aminoketones, alpha-hydroxyketones, phosphine oxides and phosphine oxide derivatives, as well as mixtures of two or more thereof. Suitable examples of cationic photoinitiators are known to those skilled in the art and include without limitation onium salts such as organic iodonium salts (e.g. diaryl iodoinium salts), oxonium (e.g. triaryloxonium salts) and sulfonium salts (e.g. triarylsulphonium salts), as well as mixtures of two or more thereof. Other examples of useful photoinitiators can be found in standard textbooks such as "Chemistry & Technology of UV & EB Formulation for Coatings, Inks & Paints", Volume III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited. It may also be advantageous to include a sensitizer in conjunction with the one or more photoinitiators in order to achieve efficient curing. Typical examples of suitable photosensitizers include without limitation isopropyl-thioxanthone (ITX), 1-chloro-2-propoxy-thioxanthone (CPTX), 2-chloro-thioxanthone (CTX) and 2,4-diethyl-thioxanthone (DETX) and mixtures of two or more thereof. The one or more photoinitiators comprised in the UV-Vis radiation curable coating compositions are preferably present in a total amount from about 0.1 wt-% to about 20 wt-%, more preferably about 1 wt-% to about 15 wt-%, the weight percents being based on the total weight of the UV-Vis radiation curable coating compositions.

The radiation curable coating composition described herein may further comprise one or more marker substances or taggants and/or one or more machine readable materials selected from the group consisting of magnetic materials (different from the platelet-shaped magnetic or magnetizable pigment particles described herein), luminescent materials, electrically conductive materials and infrared-absorbing materials. As used herein, the term "machine readable material" refers to a material which exhibits at least one distinctive property which is not perceptible by the naked eye, and which can be comprised in a layer so as to confer a way to authenticate said layer or article comprising said layer by the use of a particular equipment for its authentication.

The radiation curable coating composition described herein may further comprise one or more coloring components selected from the group consisting of organic pigment particles, inorganic pigment particles, and organic dyes, and/or one or more additives. The latter include without limitation compounds and materials that are used for adjusting physical, rheological and chemical parameters of the radiation curable coating composition such as the viscosity (e.g. solvents, thickeners and surfactants), the consistency (e.g. anti-settling agents, fillers and plasticizers), the foaming properties (e.g. antifoaming agents), the lubricating properties (waxes, oils), UV stability (photostabilizers), the adhesion properties, the antistatic properties, the storage stability (polymerization inhibitors) etc. Additives described herein may be present in the radiation curable coating composition in amounts and in forms known in the art, including so-called nano-materials where at least one of the dimensions of the additive is in the range of 1 to 1000 nm.

The radiation curable coating composition described herein comprises non-spherical magnetic or magnetizable pigment particles described herein. Preferably, the non-spherical magnetic or magnetizable pigment particles are present in an amount from about 2 wt-% to about 40 wt-%, more preferably about 4 wt-% to about 30 wt-%, the weight percents being based on the total weight of the radiation curable coating composition comprising the binder material, the non-spherical magnetic or magnetizable pigment particles and other optional components of the radiation curable coating composition.

Non-spherical magnetic or magnetizable pigment particles described herein are defined as having, due to their non-spherical shape, non-isotropic reflectivity with respect to an incident electromagnetic radiation for which the hardened binder material is at least partially transparent. As used herein, the term "non-isotropic reflectivity" denotes that the proportion of incident radiation from a first angle that is reflected by a particle into a certain (viewing) direction (a second angle) is a function of the orientation of the particles, i.e. that a change of the orientation of the particle with respect to the first angle can lead to a different magnitude of the reflection to the viewing direction. Preferably, the non-spherical magnetic or magnetizable pigment particles described herein have a non-isotropic reflectivity with respect to incident electromagnetic radiation in some parts or in the complete wavelength range of from about 200 to about 2500 nm, more preferably from about 400 to about 700 nm, such that a change of the particle's orientation results in a change of reflection by that particle into a certain direction. As known by the man skilled in the art, the magnetic or magnetizable pigment particles described herein are different from conventional pigments, said conventional pigment particles displaying the same color for all viewing angles, whereas the magnetic or magnetizable pigment particles described herein exhibit non-isotropic reflectivity as described hereabove.

The non-spherical magnetic or magnetizable pigment particles are preferably prolate or oblate ellipsoid-shaped, platelet-shaped or needle-shaped particles or a mixture of two or more thereof and more preferably platelet-shaped particles.

Suitable examples of non-spherical magnetic or magnetizable pigment particles described herein include without limitation pigment particles comprising a magnetic metal selected from the group consisting of cobalt (Co), iron (Fe), gadolinium (Gd) and nickel (Ni); magnetic alloys of iron, manganese, cobalt, nickel and mixtures of two or more thereof; magnetic oxides of chromium, manganese, cobalt, iron, nickel and mixtures of two or more thereof; and mixtures of two or more thereof. The term "magnetic" in reference to the metals, alloys and oxides is directed to ferromagnetic or ferrimagnetic metals, alloys and oxides. Magnetic oxides of chromium, manganese, cobalt, iron, nickel or a mixture of two or more thereof may be pure or mixed oxides. Examples of magnetic oxides include without limitation iron oxides such as hematite ($Fe_2O_3$), magnetite ($Fe_3O_4$), chromium dioxide ($CrO_2$), magnetic ferrites ($MFe_2O_4$), magnetic spinels ($MR_2O_4$), magnetic hexaferrites ($MFe_{12}O_{19}$), magnetic orthoferrites ($RFeO_3$), magnetic garnets $M_3R_2(AO_4)_3$, wherein M stands for two-valent metal, R stands for three-valent metal, and A stands for four-valent metal.

Examples of non-spherical magnetic or magnetizable pigment particles described herein include without limitation pigment particles comprising a magnetic layer M made from one or more of a magnetic metal such as cobalt (Co), iron (Fe), gadolinium (Gd) or nickel (Ni); and a magnetic alloy of iron, cobalt or nickel, wherein said platelet-shaped magnetic or magnetizable pigment particles may be multilayered structures comprising one or more additional layers. Preferably, the one or more additional layers are layers A independently made from one or more materials selected from the group consisting of metal fluorides such as magnesium fluoride ($MgF_2$), silicium oxide (SiO), silicium dioxide ($SiO_2$), titanium oxide ($TiO_2$), zinc sulphide (ZnS) and aluminum oxide ($Al_2O_3$), more preferably silicium dioxide ($SiO_2$); or layers B independently made from one or more materials selected from the group consisting of metals and metal alloys, preferably selected from the group consisting of reflective metals and reflective metal alloys, and more preferably selected from the group consisting of aluminum (Al), chromium (Cr), and nickel (Ni), and still more preferably aluminum (Al); or a combination of one or more layers A such as those described hereabove and one or more layers B such as those described hereabove. Typical examples of the platelet-shaped magnetic or magnetizable pigment particles being multilayered structures described hereabove include without limitation A/M multilayer structures, A/M/A multilayer structures, A/M/B multilayer structures, A/B/M/A multilayer structures, A/B/M/B multilayer structures, A/B/M/B/A multilayer structures, B/M multilayer structures, B/M/B multilayer structures, B/A/M/A multilayer structures, B/A/M/B multilayer structures, B/A/M/B/A/multilayer structures, wherein the layers A, the magnetic layers M and the layers B are chosen from those described hereabove.

At least part of the non-spherical magnetic or magnetizable pigment particles described herein may be constituted by non-spherical optically variable magnetic or magnetizable pigment particles and/or non-spherical magnetic or magnetizable pigment particles having no optically variable properties. Preferably, at least a part of the non-spherical magnetic or magnetizable pigment particles described herein is constituted by non-spherical optically variable magnetic or magnetizable pigment particles. In addition to the overt security provided by the colorshifting property of non-spherical optically variable magnetic or magnetizable pigment particles, which allows easily detecting, recognizing and/or discriminating an article or security document carrying an ink, radiation curable coating composition, coating or layer comprising the non-spherical optically variable magnetic or magnetizable pigment particles described herein from their possible counterfeits using the unaided human senses, the optical properties of the platelet-shaped optically variable magnetic or magnetizable pigment particles may also be used as a machine readable tool for the recognition of the OEL. Thus, the optical properties of the non-spherical optically variable magnetic or magnetizable pigment particles may simultaneously be used as a covert or semi-covert security feature in an authentication process wherein the optical (e.g. spectral) properties of the pigment particles are analyzed. The use of non-spherical optically variable magnetic or magnetizable pigment particles in radiation curable coating compositions for producing an OEL enhances the significance of the OEL as a security feature in security document applications, because such materials (i.e. non-spherical optically variable magnetic or magnetizable pigment particles) are reserved to the security document printing industry and are not commercially available to the public.

Moreover, and due to their magnetic characteristics, the non-spherical magnetic or magnetizable pigment particles described herein are machine readable, and therefore radiation curable coating compositions comprising those pigment particles may be detected for example with specific magnetic detectors. Radiation curable coating compositions comprising the non-spherical magnetic or magnetizable pigment particles described herein may therefore be used as a covert or semi-covert security element (authentication tool) for security documents.

As mentioned above, preferably at least a part of the non-spherical magnetic or magnetizable pigment particles is constituted by non-spherical optically variable magnetic or magnetizable pigment particles. These can more preferably be selected from the group consisting of non-spherical magnetic thin-film interference pigment particles, non-spherical magnetic cholesteric liquid crystal pigment particles, non-spherical interference coated pigment particles comprising a magnetic material and mixtures of two or more thereof.

Magnetic thin film interference pigment particles are known to those skilled in the art and are disclosed e.g. in U.S. Pat. No. 4,838,648; WO 2002/073250 A2; EP 0 686 675 B1; WO 2003/000801 A2; U.S. Pat. No. 6,838,166; WO 2007/131833 A1; EP 2 402 401 A1 and in the documents cited therein. Preferably, the magnetic thin film interference pigment particles comprise pigment particles having a five-layer Fabry-Perot multilayer structure and/or pigment particles having a six-layer Fabry-Perot multilayer structure and/or pigment particles having a seven-layer Fabry-Perot multilayer structure.

Preferred five-layer Fabry-Perot multilayer structures consist of absorber/dielectric/reflector/dielectric/absorber multilayer structures wherein the reflector and/or the absorber is also a magnetic layer, preferably the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co).

Preferred six-layer Fabry-Perot multilayer structures consist of absorber/dielectric/reflector/magnetic/dielectric/absorber multilayer structures.

Preferred seven-layer Fabry Perot multilayer structures consist of absorber/dielectric/reflector/magnetic/reflector/dielectric/absorber multilayer structures such as disclosed in U.S. Pat. No. 4,838,648.

Preferably, the reflector layers described herein are independently made from one or more materials selected from the group consisting of metals and metal alloys, preferably selected from the group consisting of reflective metals and reflective metal alloys, more preferably selected from the group consisting of aluminum (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, even more preferably selected from the group consisting of aluminum (Al), chromium (Cr), nickel (Ni) and alloys thereof, and still more preferably aluminum (Al). Preferably, the dielectric layers are independently made from one or more materials selected from the group consisting of metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g. $Na_3AlF_6$), neodymium fluoride ($NdF_3$), samarium fluoride ($SmF_3$), barium fluoride ($BaF_2$), calcium fluoride ($CaF_2$), lithium fluoride (LiF), and metal oxides such as silicium oxide (SiO), silicium dioxide ($SiO_2$), titanium oxide ($TiO_2$), aluminum oxide ($Al_2O_3$), more preferably selected from the group consisting of magnesium fluoride ($MgF_2$) and silicium dioxide ($SiO_2$) and still more preferably magnesium fluoride ($MgF_2$). Preferably, the absorber layers are independently made from one or more materials selected from the group consisting of aluminum (Al), silver (Ag), copper (Cu), palladium (Pd), platinum (Pt), titanium (Ti), vanadium (V), iron (Fe) tin (Sn), tungsten (W), molybdenum (Mo), rhodium (Rh), Niobium (Nb), chromium (Cr), nickel (Ni), metal oxides thereof, metal sulfides thereof, metal carbides thereof, and metal alloys thereof, more preferably selected from the group consisting of chromium (Cr), nickel (Ni), metal oxides thereof, and metal alloys thereof, and still more preferably selected from the group consisting of chromium (Cr), nickel (Ni), and metal alloys thereof. Preferably, the magnetic layer comprises nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co). When magnetic thin film interference pigment particles comprising a seven-layer Fabry-Perot structure are preferred, it is particularly preferred that the magnetic thin film interference pigment particles comprise a seven-layer Fabry-Perot absorber/dielectridreflector/magnetic/reflector/dielectric/absorber multilayer structure consisting of a $Cr/MgF_2/Al/M/Al/MgF_2/Cr$ multilayer structure, wherein M a magnetic layer comprising nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co).

The magnetic thin film interference pigment particles described herein may be multilayer pigment particles being considered as safe for human health and the environment and being based for example on five-layer Fabry-Perot multilayer structures, six-layer Fabry-Perot multilayer structures and seven-layer Fabry-Perot multilayer structures, wherein said pigment particles include one or more magnetic layers comprising a magnetic alloy having a substantially nickel-free composition including about 40 wt-% to about 90 wt-% iron, about 10 wt-% to about 50 wt-% chromium and about 0 wt-% to about 30 wt-% aluminum. Typical examples of multilayer pigment particles being considered as safe for human health and the environment can be found in EP 2 402 401 A1 which is hereby incorporated by reference in its entirety.

Magnetic thin film interference pigment particles described herein are typically manufactured by a conventional deposition technique for the different required layers onto a web. After deposition of the desired number of layers, e.g. by physical vapor deposition (PVD), chemical vapor deposition (CVD) or electrolytic deposition, the stack of layers is removed from the web, either by dissolving a release layer in a suitable solvent, or by stripping the material from the web. The so-obtained material is then broken down to platelet-shaped pigment particles which have to be further processed by grinding, milling (such as for example jet milling processes) or any suitable method so as to obtain pigment particles of the required size. The resulting product consists of flat platelet-shaped pigment particles with broken edges, irregular shapes and different aspect ratios. Further information on the preparation of suitable platelet-shaped magnetic thin film interference pigment particles can be found e.g. in EP 1 710 756 A1 and EP 1 666 546 A1 which are hereby incorporated by reference.

Suitable magnetic cholesteric liquid crystal pigment particles exhibiting optically variable characteristics include without limitation magnetic monolayered cholesteric liquid crystal pigment particles and magnetic multilayered cholesteric liquid crystal pigment particles. Such pigment particles are disclosed for example in WO 2006/063926 A1, U.S. Pat. Nos. 6,582,781 and 6,531,221. WO 2006/063926 A1 discloses monolayers and pigment particles obtained therefrom with high brilliance and colorshifting properties with additional particular properties such as magnetizability. The disclosed monolayers and pigment particles, which are obtained therefrom by comminuting said monolayers, include a three-dimensionally crosslinked cholesteric liquid crystal mixture and magnetic nanoparticles. U.S. Pat. Nos.

6,582,781 and 6,410,130 disclose cholesteric multilayer pigment particles which comprise the sequence $A^1/B/A^2$, wherein $A^1$ and $A^2$ may be identical or different and each comprises at least one cholesteric layer, and B is an interlayer absorbing all or some of the light transmitted by the layers $A^1$ and $A^2$ and imparting magnetic properties to said interlayer. U.S. Pat. No. 6,531,221 discloses platelet-shaped cholesteric multilayer pigment particles which comprise the sequence A/B and optionally C, wherein A and C are absorbing layers comprising pigment particles imparting magnetic properties, and B is a cholesteric layer.

Suitable interference coated pigments comprising one or more magnetic materials include without limitation structures consisting of a substrate selected from the group consisting of a core coated with one or more layers, wherein at least one of the core or the one or more layers have magnetic properties. For example, suitable interference coated pigments comprise a core made of a magnetic material such as those described hereabove, said core being coated with one or more layers made of one or more metal oxides, or they have a structure consisting of a core made of synthetic or natural micas, layered silicates (e.g. talc, kaolin and sericite), glasses (e.g. borosilicates), silicium dioxides ($SiO_2$), aluminum oxides ($Al_2O_3$), titanium oxides ($TiO_2$), graphites and mixtures of two or more thereof. Furthermore, one or more additional layers such as coloring layers may be present.

The non-spherical magnetic or magnetizable pigment particles described herein may be surface treated so at to protect them against any deterioration that may occur in the radiation curable coating composition and/or to facilitate their incorporation in the radiation curable coating composition; typically corrosion inhibitor materials and/or wetting agents may be used.

According to one embodiment and provided that the non-spherical magnetic or magnetizable pigment particles are platelet-shaped pigment particles, the process for producing the optical effect layer described herein may further comprise a step of exposing the radiation curable coating composition described herein to a dynamic magnetic field of a first magnetic-field-generating device so as to bi-axially orient at least a part of the platelet-shaped magnetic or magnetizable pigment particles, said step being carried out after step a) and before step b). Processes comprising such a step of exposing a coating composition to a dynamic magnetic field of a first magnetic-field-generating device so as to bi-axially orient at least a part of the platelet-shaped magnetic or magnetizable pigment particles before a step of further exposing the coating composition to a second magnetic-field-generating device, in particular to the magnetic field of the magnetic assembly described herein, are disclosed in WO 2015/086257 A1. Subsequently to the exposure of the radiation curable coating composition to the dynamic magnetic field of the first magnetic-field-generating device described herein and while the radiation curable coating composition is still wet or soft enough so that the platelet-shaped magnetic or magnetizable pigment particles therein can be further moved and rotated, the platelet-shaped magnetic or magnetizable pigment particles are further re-oriented by the use of the magnetic field of magnetic assembly described herein.

Carrying out a bi-axial orientation means that platelet-shaped magnetic or magnetizable pigment particles are made to orientate in such a way that their two main axes are constrained. That is, each platelet-shaped magnetic or magnetizable pigment particle can be considered to have a major axis in the plane of the pigment particle and an orthogonal minor axis in the plane of the pigment particle. The major and minor axes of the platelet-shaped magnetic or magnetizable pigment particles are each caused to orient according to the dynamic magnetic field. Effectively, this results in neighbouring platelet-shaped magnetic pigment particles that are close to each other in space to be essentially parallel to each other. In order to perform a bi-axial orientation, the platelet-shaped magnetic pigment particles must be subjected to a strongly time-dependent external magnetic field. Put another way, bi-axial orientation aligns the planes of the platelet-shaped magnetic or magnetizable pigment particles so that the planes of said pigment particles are oriented to be essentially parallel relative to the planes of neighbouring (in all directions) platelet-shaped magnetic or magnetizable pigment particles. In an embodiment, both the major axis and the minor axis perpendicular to the major axis described hereabove of the planes of the platelet-shaped magnetic or magnetizable pigment particles are oriented by the dynamic magnetic field so that neighbouring (in all directions) pigment particles have their major and minor axes aligned with each other.

According to one embodiment, the step of carrying out a bi-axial orientation of the platelet-shaped magnetic or magnetizable pigment particles leads to a magnetic orientation wherein the platelet-shaped magnetic or magnetizable pigment particles have their two main axes substantially parallel to the substrate surface. For such an alignment, the platelet-shaped magnetic or magnetizable pigment particles are planarized within the radiation curable coating composition on the substrate and are oriented with both their X-axis and Y-axis (shown in FIG. 1 of WO 2015/086257 A1) parallel with the substrate surface.

According to another embodiment, the step of carrying a bi-axial orientation of the platelet-shaped magnetic or magnetizable pigment particles leads to a magnetic orientation wherein the platelet-shaped magnetic or magnetizable pigment particles have a first axis within the X-Y plane substantially parallel to the substrate surface and a second axis being perpendicular to said first axis at a substantially non-zero elevation angle to the substrate surface.

According to another embodiment, the step of carrying a bi-axial orientation of the platelet-shaped magnetic or magnetizable pigment particles leads to a magnetic orientation wherein the platelet-shaped magnetic or magnetizable pigment particles have their X-Y plane parallel to an imaginary spheroid surface.

Particularly preferred magnetic-field-generating devices for bi-axially orienting the platelet-shaped magnetic or magnetizable pigment particles are disclosed in EP 2 157 141 A1. The magnetic-field-generating device disclosed in EP 2 157 141 A1 provides a dynamic magnetic field that changes its direction forcing the platelet-shaped magnetic or magnetizable pigment particles to rapidly oscillate until both main axes, X-axis and Y-axis, become parallel to the substrate surface, i.e. the platelet-shaped magnetic or magnetizable pigment particles rotate until they come to the stable sheet-like formation with their X and Y axes parallel to the substrate surface and are planarized in said two dimensions.

Other particularly preferred magnetic-field-generating devices for bi-axially orienting the platelet-shaped magnetic or magnetizable pigment particles comprise linear permanent magnet Halbach arrays, i.e. assemblies comprising a plurality of magnets with different magnetisation directions. Detailed description of Halbach permanent magnets was given by Z. Q. Zhu et D. Howe (Halbach permanent magnet machines and applications: a review, *IEE. Proc. Electric Power Appl.*, 2001, 148, p. 299-308). The magnetic field produced by such a Halbach array has the properties that it is concentrated on one side while being weakened almost to zero on the other side. The co-pending Application EP 14195159.0 discloses suitable devices for bi-axially orienting platelet-shaped magnetic or magnetizable pigment particles, wherein said devices comprise a Halbach cylinder assembly. Other particularly preferred magnetic-field-generating devices for bi-axially orienting the platelet-shaped magnetic or magnetizable pigment particles are spinning magnets, said magnets comprising disc-shaped spinning magnets or magnet assemblies that are essentially magnetized along their diameter. Suitable spinning magnets or magnet assemblies are described in US 2007/0172261 A1, said spinning magnets or magnet assemblies generate radially symmetrical time-variable magnetic fields, allowing the bi-orientation of platelet-shaped magnetic or magnetizable pigment particles of a not yet hardened coating composition. These magnets or magnet assemblies are driven by a shaft (or spindle) connected to an external motor. CN 102529326 B discloses examples of magnetic-field-generating devices comprising spinning magnets that might be suitable for bi-axially orienting platelet-shaped magnetic or magnetizable pigment particles. In a preferred embodiment, suitable magnetic-field-generating devices for bi-axially orienting platelet-shaped magnetic or magnetizable pigment particles are shaft-free disc-shaped spinning magnets or magnet assemblies constrained in a housing made of non-magnetic, preferably non-conducting, materials and are driven by one or more magnet-wire coils wound around the housing. Examples of such shaft-free disc-shaped spinning magnets or magnet assemblies are disclosed in WO 2015/082344 A1 and in the co-pending Application EP 14181939.1.

The substrate described herein is preferably selected from the group consisting of papers or other fibrous materials, such as cellulose, paper-containing materials, glasses, metals, ceramics, plastics and polymers, metalized plastics or polymers, composite materials and mixtures or combinations thereof. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents. Typical examples of plastics and polymers include polyolefins such as polyethylene (PE) and polypropylene (PP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Spunbond olefin fibers such as those sold under the trademark Tyvek® may also be used as substrate. Typical examples of metalized plastics or polymers include the plastic or polymer materials described hereabove having a metal disposed continuously or discontinuously on their surface. Typical example of metals include without limitation aluminum (Al), chromium (Cr), copper (Cu), gold (Au), iron (Fe), nickel (Ni), silver (Ag), combinations thereof or alloys of two or more of the aforementioned metals. The metallization of the plastic or polymer materials described hereabove may be done by an electrodeposition process, a high-vacuum coating process or by a sputtering process. Typical examples of composite materials include without limitation multilayer structures or laminates of paper and at least one plastic or polymer material such as those described hereabove as well as plastic and/or polymer fibers incorporated in a paper-like or fibrous material such as those described hereabove. Of course, the substrate can comprise further additives that are known to the skilled person, such as sizing agents, whiteners, processing aids, reinforcing or wet strengthening agents, etc. The substrate described herein may be provided under the form of a web (e.g. a continuous sheet of the materials described hereabove) or under the form of sheets. Should the OEL produced according to the present invention be on a security document, and with the aim of further increasing the security level and the resistance against counterfeiting and illegal reproduction of said security document, the substrate may comprise printed, coated, or laser-marked or laser-perforated indicia, watermarks, security threads, fibers, planchettes, luminescent compounds, windows, foils, decals and combinations of two or more thereof. With the same aim of further increasing the security level and the resistance against counterfeiting and illegal reproduction of security documents, the substrate may comprise one or more marker substances or taggants and/or machine readable substances (e.g. luminescent substances, UV/visible/IR absorbing substances, magnetic substances and combinations thereof).

Also described herein are magnetic assemblies for producing an OEL such as those described herein on the substrate described herein, said OEL comprising the non-spherical magnetic or magnetizable pigment particles being oriented in the cured radiation curable coating composition such as described herein.

Magnetic assemblies for producing an OEL on a substrate such as those described herein comprises:

i) a magnetic-field generating device (130, 230, 330, 430) forming a loop-shaped form (hereafter referred as loop-shaped magnetic-field generating device) and having a North-South magnetic axis being substantially perpendicular to the substrate (120, 220, 320, 420) surface onto which the radiation curable composition comprising the non-spherical magnetic or magnetizable pigment particles is applied; and;

ii) a magnetic-field generating device (140, 240, 340, 440) made of a bar dipole magnet or a combination of bar dipole magnets, wherein said bar dipole magnet or said combination of bar dipole magnets have a North-South magnetic axis, a resulting North-South magnetic axis respectively, substantially parallel to the substrate (120, 220, 320, 420) surface onto which the radiation curable composition comprising the non-spherical magnetic or magnetizable pigment particles is applied.

The loop-shaped magnetic-field generating device (130, 230, 330, 430)

i) may be made of a single loop-shaped dipole magnet having a North-South magnetic axis substantially perpendicular to the substrate (120, 220, 320, 420) surface, or ii) may be a combination of two or more dipole magnets disposed in a loop-shaped configuration and having a resulting North-South magnetic axis perpendicular to the substrate (120, 220, 320, 420 ) surface.

The loop-shaped dipole magnets or the two or more dipole magnets disposed in a loop-shaped arrangement of the loop-shaped magnetic-field generating device (130, 230, 330, 430) are preferably made of materials selected from the group comprising Alnico alloy, such as for example Alnico 5 (R1-1-1), Alnico 5 DG (R1-1-2), Alnico 5-7 (R1-1-3), Alnico 6 (R1-1-4), Alnico 8 (R1-1-5), Alnico 8 HC (R1-1-7) and Alnico 9 (R1-1-6); ferrites such as for example strontium hexaferrite ($SrFe_{12}O19$), barium hexaferrite, cobalt alloys, ceramic 5 (SI-1-6), ceramic 7 (SI-1-2), ceramic 8 (SI-1-5), or rare-earth-iron alloys such as RECo5 (with RE=Sm or Pr), RE2TM17 (with RE=Sm, TM=Fe, Cu, Co, Zr, Hf), RE2TM14B (with RE=Nd, Pr, Dy, TM=Fe, Co); anisotropic alloys of Fe Cr Co; materials selected from the group of PtCo, MnAlC, RE Cobalt 5/16, RE Cobalt 14. Particularly preferred are easily workable permanent-magnetic composite materials that comprise a permanent-magnetic filler, such as strontium-hexaferrite (SrFe12O19) or neodymium-iron-boron (Nd2Fe14B) powder, in a plastic- or rubber-type matrix.

The magnetic-field generating device (140, 240, 340, 440) i) may be made of a single bar dipole magnet having a North-South magnetic axis substantially parallel to the substrate (120, 220, 320, 420) surface, or
ii) may be a combination of two or more bar dipole magnets having a resulting North-South magnetic axis substantially parallel to the substrate (120, 220, 320, 420) surface.

According to one embodiment, the magnetic-field generating device (140, 240, 340, 440) is made of a single bar dipole magnet.

According to another embodiment, the magnetic-field generating device (140, 240, 340, 440) is a combination of two or more bar dipole magnets having a resulting North-South magnetic axis substantially parallel to the substrate (120, 220, 320, 420) surface. The two or more bar dipole magnets may be arranged in a symmetric configuration or in an asymmetric configuration. Preferably, all of the two or more bar dipole magnets have the same magnetic direction, i.e. all of them have their North pole facing the same direction.

The bar dipole magnets of the magnetic-field generating device (140, 240, 340, 440) are preferably made of materials selected from the group comprising Alnico alloy, such as for example Alnico 5 (R1-1-1), Alnico 5 DG (R1-1-2), Alnico 5-7 (R1-1-3), Alnico 6 (R1-1-4), Alnico 8 (R1-1-5), Alnico 8 HC (R1-1-7) and Alnico 9 (R1-1-6); ferrites such as for example strontium hexaferrite (SrFe12O19), barium hexaferrite, cobalt alloys, ceramic 5 (SI-1-6), ceramic 7 (SI-1-2), ceramic 8 (SI-1-5), or rare-earth-iron alloys such as RECo5 (with RE=Sm or Pr), RE2TM17 (with RE=Sm, TM=Fe, Cu, Co, Zr, Hf), RE2TM14B (with RE=Nd, Pr, Dy, TM=Fe, Co); anisotropic alloys of Fe Cr Co; materials selected from the group of PtCo, MnAlC, RE Cobalt 5/16, RE Cobalt 14. Particularly preferred are, however, easily workable permanent-magnetic composite materials that comprise a permanent-magnetic filler, such as strontium-hexaferrite (SrFe12O19) or neodymium-iron-boron (Nd2Fe14B) powder, in a plastic- or rubber-type matrix.

When the magnetic-field generating device (140, 240, 340, 440) is a combination of two or more bar dipole magnets, said two or more bar dipole magnets may be separated by one or more spacer pieces made of a non-magnetic material or may be comprised in a supporting matrix made of a non-magnetic material. The non-magnetic materials are preferably selected from the group consisting of low conducting materials, non-conducting materials and mixtures thereof, such as for example engineering plastics and polymers, aluminum, aluminum alloys, titanium, titanium alloys and austenitic steels (i.e. non-magnetic steels). Engineering plastics and polymers include without limitation polyaryletherketones (PAEK) and its derivatives polyetheretherketones (PEEK), poletherketoneketones (PEKK), polyetheretherketoneketones (PEEKK) and polyetherketoneetherketoneketone (PEKEKK); polyacetals, polyamides, polyesters, polyethers, copolyetheresters, polyimides, polyetherimides, high-density polyethylene (HDPE), ultra-high molecular weight polyethylene (UHMWPE), polybutylene terephthalate (PBT), polypropylene, acrylonitrile butadiene styrene (ABS) copolymer, fluorinated and perfluorinated polyethylenes, polystyrenes, polycarbonates, polyphenylenesulfide (PPS) and liquid crystal polymers. Preferred materials are PEEK (polyetheretherketone), POM (polyoxymethylene), PTFE (polytetrafluoroethylene), Nylon® (polyamide) and PPS. As shown in FIGS. 1 and 2, the loop-shaped magnetic-field generating device (130, 230, 330, 430) may located between the magnetic-field generating device (140, 240, 340, 440) and the substrate (120, 220, 320, 420) carrying the radiation curable coating composition (×10) comprising the non-spherical magnetic or magnetizable pigment particles described herein to be oriented by the magnetic assembly, or alternatively the magnetic-field generating device (140, 240, 340, 440) may be located between the loop-shaped magnetic-field generating device (130, 230, 330, 430) and the substrate (120, 220, 320, 420).

The distance (d) between the loop-shaped magnetic-field generating device (130, 230, 330, 430) and the magnetic-field generating device (140, 240, 340, 440) may be comprised in the range comprised between about 0 and about 10 mm, preferably between about 0 and about 3 mm so as have a more compact magnetic assembly.

The materials of the dipole magnets comprised in the loop-shaped magnetic-field generating device (130, 230, 330, 430), the materials of the dipole magnets of the magnetic-field generating device (140, 240, 340, 440), and the distances (d) are selected such that the magnetic field resulting from the interaction of the magnetic field produced by the loop-shaped magnetic-field generating device (130, 230, 330, 430) and the magnetic field produced by the magnetic-field generating device (140, 240, 340, 440), i.e. the resulting field of the magnetic assemblies described herein, is suitable for producing the optical effects layers described herein.

The magnetic assemblies for producing an OEL described herein may further comprise an engraved magnetic plate, such as those disclosed for example in WO 2005/002866 A1 and WO 2008/046702 A1. The engraved magnetic plate is located between the loop-shaped magnetic-field generating device (130, 230, 330, 430) or the magnetic-field generating device (140, 240, 340, 440) and the substrate surface, so as to locally modify the magnetic field of the magnetic assembly. Such an engraved plate may be made from iron (iron yokes). Alternatively, such an engraved plate may be made from a plastic material such as those described herein in which magnetic particles are dispersed (such as for example Plastoferrite).

FIG. 1A illustrates an example of a magnetic assembly suitable for producing optical effect layers (OELs) (110) comprising non-spherical magnetic or magnetizable pigment particles on a substrate (120) according to the present invention. The magnetic assembly of FIG. 1A comprises a magnetic-field generating device being a bar dipole magnet (140), said bar dipole magnet being disposed on top of a loop-shaped magnetic-field generating device being a ring-shaped dipole magnet (130).

The magnetic-field generating device (140) being bar dipole magnet may be a parallelepiped having a length (L1), a width (L2) and a thickness (L3) as shown in FIG. 1A. The North-South magnetic axis of the bar dipole magnet (140) is substantially parallel to the substrate (120) surface.

The loop-shaped magnetic-field generating device being a ring-shaped dipole magnet (130) shown in FIG. 1 has an external diameter (L4), an internal diameter (L5) and a thickness (L6). The North-South magnetic axis of the ring-shaped dipole magnet (130) is substantially perpendicular to the North-South magnetic axis of the ring-shaped dipole magnet (140), i.e. substantially perpendicular to the substrate (120) surface.

The loop-shaped magnetic-field generating device being a ring-shaped dipole magnet (130) and the magnetic-field generating device being a bar dipole magnet (140) are preferably in direct contact, i.e. the distance (d) between the ring-shaped dipole magnet (130) and the bar dipole magnet (140) is about 0 mm (not shown true to scale in FIG. 1 for the clarity of the drawing). The distance between the upper bar dipole magnet (140) surface and the surface of the substrate (120) facing the bar dipole magnet (140) is illustrated by the distance h. Preferably, the distance h is between about 0.1 and about 10 mm, and more preferably between about 0.2 and about 5 mm.

The resulting OEL produced by the magnetic assembly illustrated in FIG. 1A is shown in FIG. 1B as seen under different viewing angles by tilting the substrate (120) between −30° and +20°. The so-obtained OEL provides an optical impression of a ring-shaped body having a size that varies upon tilting the substrate comprising the optical effect layer.

Figure 2A:
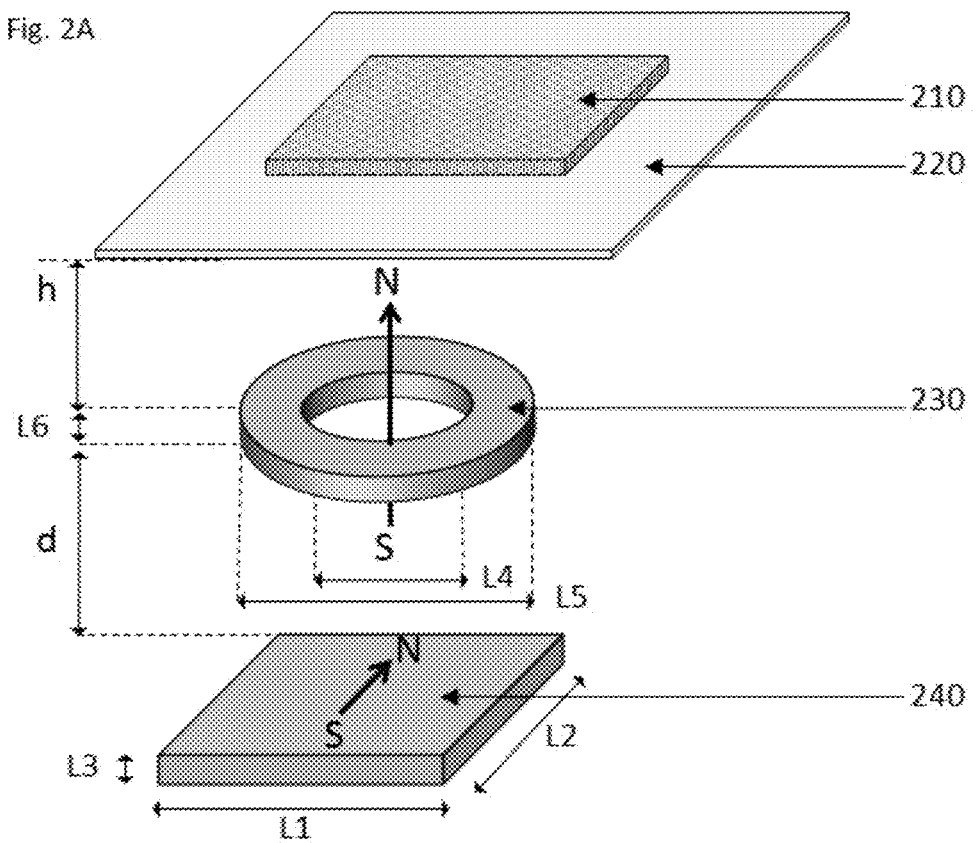
FIG. 2A schematically illustrates a magnetic assembly comprising the loop-shaped magnetic-field generating device (230) of FIG. 1A and the magnetic-field generating device (240) of FIG. 1A in another configuration, said magnetic assembly being suitable for producing an optical effect layer (210) on a substrate (220).

FIG. 2A illustrates another example of a magnetic assembly suitable for producing optical effect layers (OELs) (210) comprising non-spherical magnetic or magnetizable pigment particles on a substrate (220) according to the present invention. The magnetic assembly of FIG. 2A comprises a magnetic-field generating device being a bar dipole magnet (240) being disposed below a loop-shaped magnetic-field generating device being a ring-shaped dipole magnet (230).

The magnetic-field generating device being a bar dipole magnet (240) may be a parallelepiped having a length (L1), a width (L2) and a thickness (L3) shown in FIG. 3. The North-South magnetic axis of said bar dipole magnet (240) is substantially parallel to the substrate (220) surface.

The loop-shaped magnetic-field generating device being a ring-shaped dipole magnet (230) shown in FIG. 2A has an external diameter (L4), an internal diameter (L5) and a thickness (L6). The North-South magnetic axis of (230) of the ring-shaped dipole magnet (230) is substantially perpendicular to the North-South magnetic axis of the magnetic-field generating device being a bar dipole magnet (240), i.e. substantially perpendicular to the substrate (220) surface.

As shown in FIG. 2A, the loop-shaped magnetic-field generating device being a ring-shaped dipole magnet (230) and the magnetic-field generating device being a bar dipole magnet (240) are preferably in direct contact, i.e. the distance (d) between the ring-shaped dipole magnet (230) and the bar dipole magnet (240) is about 0 mm (not shown true to scale in FIG. 2A for the clarity of the drawing). The distance between the upper bar dipole magnet (240) surface and the surface of the substrate (220) facing the bar dipole magnet (240) is illustrated by the distance h. Preferably, the distance h is between about 0.1 and about 10 mm, and more preferably between about 0.2 and about 5 mm.

Figure 2B:
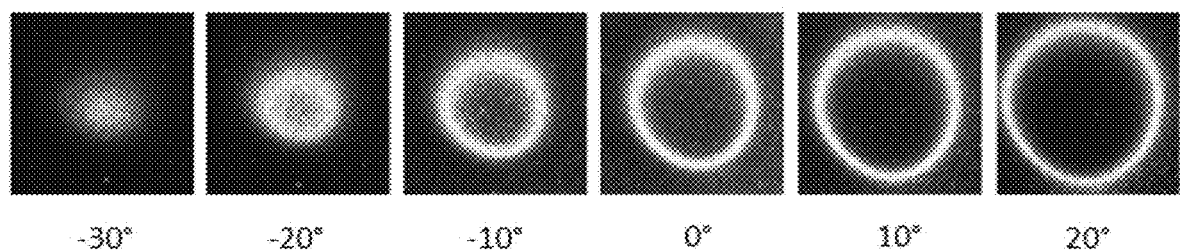
FIG. 2B shows pictures of an OEL obtained by using the magnetic assembly illustrated in FIG. 2A, as viewed under different viewing angles.

The resulting OEL produced by the magnetic assembly illustrated in FIG. 2A is shown in FIG. 2B as seen under different viewing angles by tilting the substrate (220) between −30° and +20°. The so-obtained OEL provides an optical impression of a ring-shaped body having a size that varies upon tilting the substrate comprising the optical effect layer.

Figure 3A:
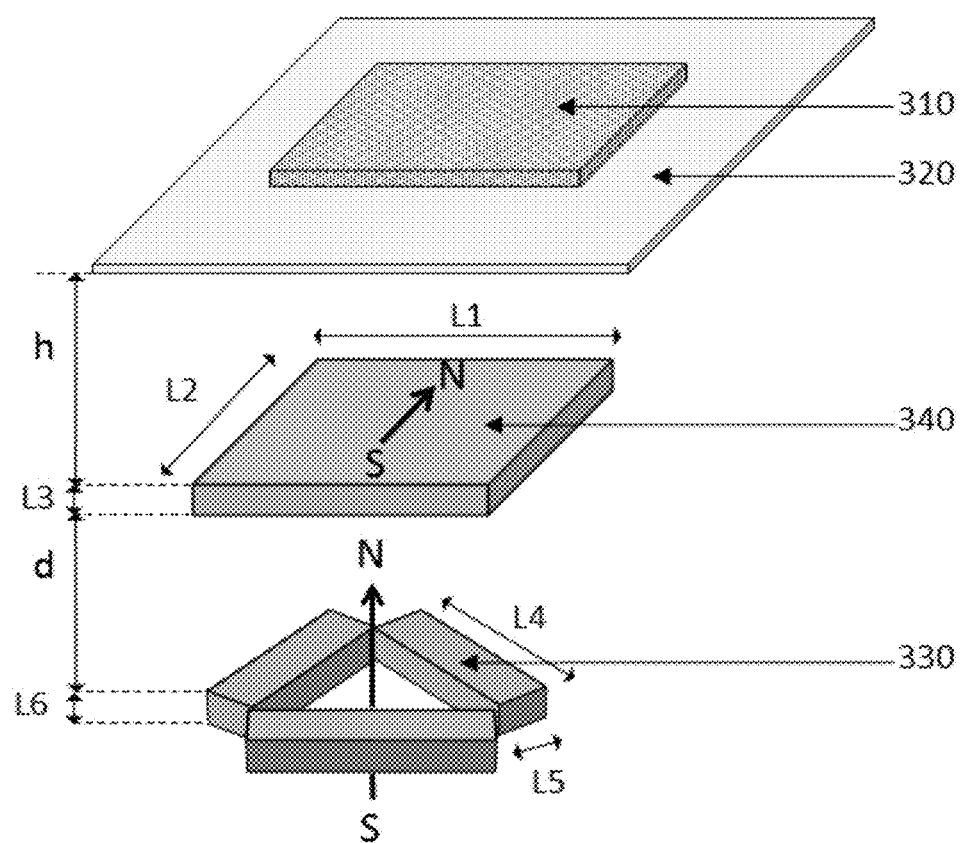
FIG. 3A schematically illustrates a magnetic assembly comprising a loop-shaped magnetic-field generating device (330), in particular a combination of three bar dipole magnets disposed in a triangular loop-shaped arrangement, and a magnetic-field generating device (340) suitable for producing an optical effect layer (310) on a substrate (320).

FIG. 3A illustrates another example of a magnetic assembly suitable for producing optical effect layers (OELs) (310) comprising non-spherical magnetizable pigment particles on a substrate (320) according to the present invention. The magnetic assembly of FIG. 3A comprises a magnetic-field generating device being a bar dipole magnet (340) being disposed on top of a loop-shaped magnetic-field generating device being a triangular loop-shaped magnetic device (330), wherein said triangular loop-shaped magnetic device comprises three dipole magnets disposed in a triangular loop-shaped arrangement.

The magnetic-field generating device being a bar dipole magnet (340) may be a parallelepiped having a length (L1), a width (L2) and a thickness (L3) as shown in FIG. 3A. The North-South magnetic axis of said bar dipole magnet (340) is substantially parallel to the substrate (320) surface.

Each one of the three dipole magnets forming the loop-shaped magnetic-field generating device being a triangular loop-shaped magnetic device (330) may be parallelepipeds having each a length (L4), a width (L5) and a thickness (L6) as shown in FIG. 3A. The North-South magnetic axis of said triangular loop-shaped magnetic device (330) is substantially perpendicular to the triangle formed by the three dipole magnets, and substantially perpendicular to the North-South magnetic axis of the bar dipole magnet (340), i.e. substantially perpendicular to the substrate (320) surface.

The loop-shaped magnetic-field generating device being a triangular loop-shaped magnetic device (330) and the magnetic-field generating device being a bar dipole magnet (340) are preferably in direct contact, i.e. the distance (d) between said triangular loop-shaped magnetic device (330) and said bar dipole magnet (340) is 0 about mm (not shown true to scale in FIG. 3A for the clarity of the drawing). The distance between the upper bar dipole magnet (340) surface and the surface of the substrate (320) facing the bar dipole magnet (340) is illustrated by the distance h. Preferably, the distance h is between about 0.1 and about 10 mm and more preferably between about 0.2 and about 5 mm.

Figure 3B:
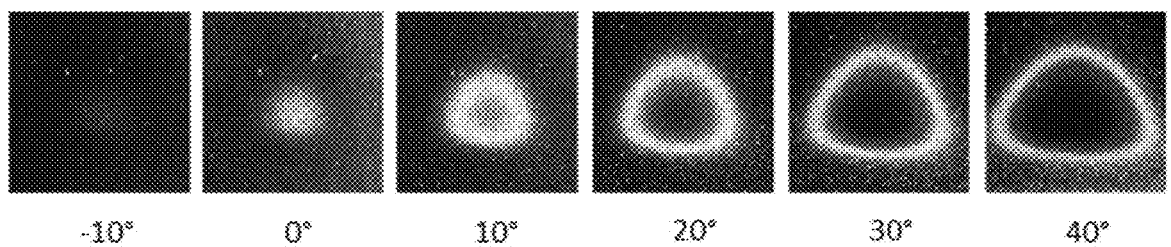
FIG. 3B shows pictures of an OEL obtained by using the magnetic assembly illustrated in FIG. 3A, as viewed under different viewing angles.

The resulting OEL produced by the magnetic assembly illustrated in FIG. 3A is shown in FIG. 3B as seen under different viewing angles by tilting the substrate (320) between −10° and +40°. The so-obtained OEL provides an optical impression of a triangular loop-shaped body having a size that varies upon tilting the substrate comprising the optical effect layer.

Figure 4A:
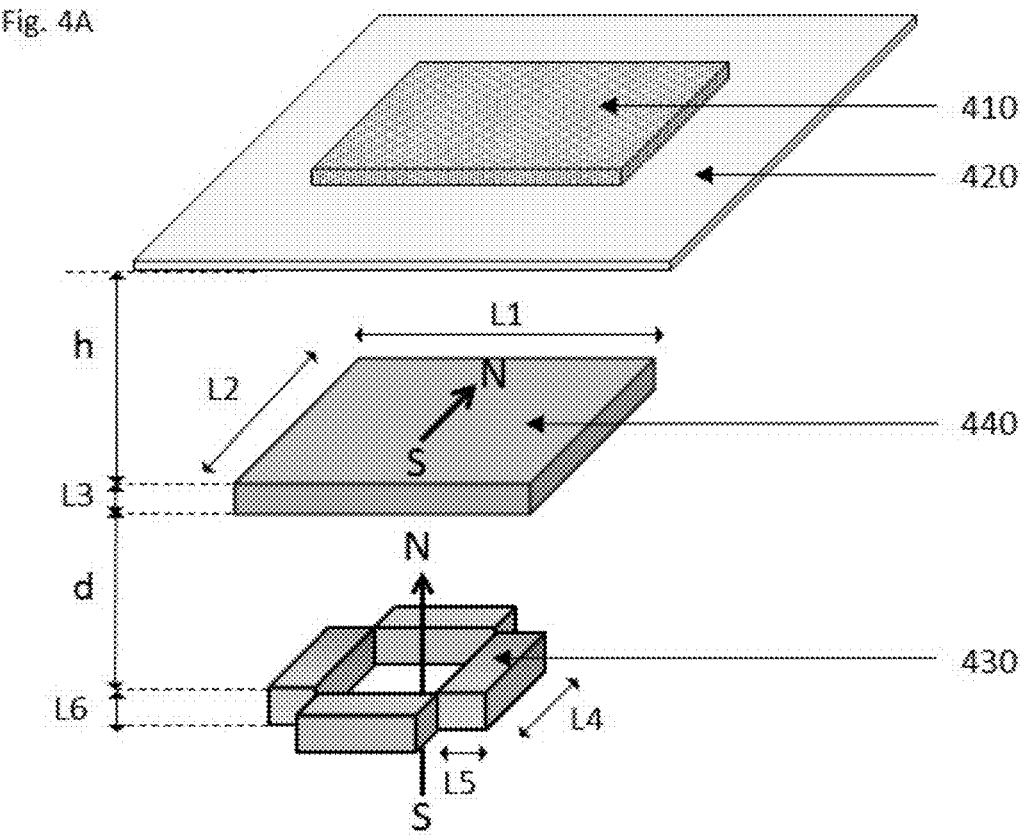
FIG. 4A schematically illustrates a magnetic assembly comprising a loop-shaped magnetic-field generating device (430), in particular a combination of four bar dipole magnets disposed in a square loop-shaped arrangement, and a magnetic-field generating device (440) suitable for producing an optical effect layer (410) on a substrate (420).

FIG. 4A illustrates another example of a magnetic assembly suitable for producing optical effect layers (OELs) (410) comprising non-spherical magnetic or magnetizable pigment particles on a substrate (420) according to the present invention, the magnetic assembly of FIG. 4A comprises a magnetic-field generating device being a bar dipole magnet (440) being disposed on top of a loop-shaped magnetic-field generating device being a square loop-shaped magnetic device (430), wherein said square loop-shaped magnetic device (430) comprises four dipole magnets disposed in a square loop-shaped arrangement.

The magnetic-field generating device being a bar dipole magnet (440) may be a parallelepiped having a length (L1), a width (L2) and a thickness (L3) as shown in FIG. 4A. The North-South magnetic axis of said bar dipole magnet (440) is substantially parallel to the substrate (420) surface.

Each one of the three dipole magnets forming the loop-shaped magnetic-field generating device being a square loop-shaped magnetic device (430) may be parallelepipeds having each a length (L4), a width (L5) and a thickness (L6) as shown in FIG. 4A. The North-South magnetic axis of said square loop-shaped magnetic device (430) is substantially perpendicular to the square formed by the four dipole magnets, and substantially perpendicular to the North-South magnetic axis of the bar dipole magnet (440), i.e. substantially perpendicular to the substrate (420) surface.

The loop-shaped magnetic-field generating device being a square loop-shaped magnetic device (430) and the magnetic-field generating device being a bar dipole magnet (440) are preferably in direct contact, i.e. the distance (d) between said square loop-shaped magnetic device (430) and said bar dipole magnet (440) is about 0 mm (not shown true to scale in FIG. 4A for the clarity of the drawing). The distance between the upper bar dipole magnet (440) surface and the surface of the substrate (420) facing the bar dipole magnet (440) is illustrated by the distance h. Preferably, the distance h is between about 0.1 and about 10 mm and more preferably between about 0.2 and about 5 mm.

Figure 4B:
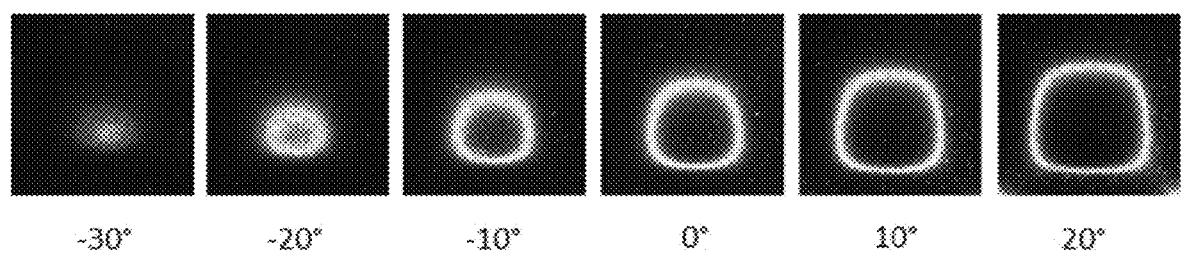
FIG. 4B shows pictures of an OEL obtained by using the magnetic assembly illustrated in FIG. 4A, as viewed under different viewing angles.

The resulting OEL produced by the magnetic assembly illustrated in FIG. 4A is shown in FIG. 4B as seen under different viewing angles by tilting the substrate (420) between −30° and +20°. The so-obtained OEL provides an optical impression of a square loop-shaped body having a size that varies upon tilting the substrate comprising the optical effect layer.

The present invention further provides printing assemblies comprising a rotating magnetic cylinder comprising one or more magnetic assemblies described herein, wherein said one or more magnetic assemblies are mounted to circumferential grooves of the rotating magnetic cylinder as well as a printing assemblies comprising a flatbed printing unit comprising one or more magnetic assemblies described herein, wherein said one or more magnetic assemblies are mounted to recesses of the flatbed printing unit.

The rotating magnetic cylinder is meant to be used in, or in conjunction with, or being part of a printing or coating equipment, and bearing one or more magnetic assemblies described herein. In an embodiment, the rotating magnetic cylinder is part of a rotary, sheet-fed or web-fed industrial printing press that operates at high printing speed in a continuous way.

The flatbed printing unit is meant to be used in, or in conjunction with, or being part of a printing or coating equipment, and bearing one or more one or more magnetic assemblies described herein. In an embodiment, the flatbed printing unit is part of a sheet-fed industrial printing press that operates in a discontinuous way.

The printing assemblies comprising the rotating magnetic cylinder described herein or the flatbed printing unit described herein may include a substrate feeder for feeding a substrate such as those described herein having thereon a layer comprising non-spherical magnetic or magnetizable pigment particles described herein, so that the one or magnetic assemblies generate a magnetic field that acts on the pigment particles to orient them to form an optical effect layer (OEL). In an embodiment of the printing assemblies comprising a rotating magnetic cylinder described herein, the substrate is fed by the substrate feeder under the form of sheets or a web. In an embodiment of the printing assemblies comprising a flatbed printing unit described herein, the substrate is fed under the form of sheets.

The printing assemblies comprising the rotating magnetic cylinder described herein or the flatbed printing unit described herein may include a coating or printing unit for applying the radiation curable coating composition comprising the non-spherical magnetic or magnetizable pigment particles described herein on the substrate described herein, the radiation curable coating composition comprising non-spherical magnetic or magnetizable pigment particles that are oriented by the magnetic field generated by the one or more magnetic assemblies described herein to form an optical effect layer (OEL). In an embodiment of the printing assemblies comprising a rotating magnetic cylinder described herein, the coating or printing unit works according to a rotary, continuous process. In an embodiment of the printing assemblies comprising a flatbed printing unit described herein, the coating or printing unit works according to a longitudinal, discontinuous process.

The printing assemblies comprising the rotating magnetic cylinder described herein or the flatbed printing unit described herein may include a curing unit for at least partially curing the radiation curable coating composition comprising non-spherical magnetic or magnetizable pigment particles that have been magnetically oriented by the one or more magnet assemblies described herein, thereby fixing the orientation and position of the non-spherical magnetic or magnetizable pigment particles to produce an optical effect layer (OEL).

The OEL described herein may be provided directly on a substrate on which it shall remain permanently (such as for banknote applications). Alternatively, an OEL may also be provided on a temporary substrate for production purposes, from which the OEL is subsequently removed. This may for example facilitate the production of the OEL, particularly while the binder material is still in its fluid state. Thereafter, after at least partially curing the coating composition for the production of the OEL, the temporary substrate may be removed from the OEL.

Alternatively, an adhesive layer may be present on the OEL or may be present on the substrate comprising an optical effect layer (OEL), said adhesive layer being on the side of the substrate opposite the side where the OEL is provided or on the same side as the OEL and on top of the OEL. Therefore an adhesive layer may be applied to the optical effect layer (OEL) or to the substrate. Such an article may be attached to all kinds of documents or other articles or items without printing or other processes involving machinery and rather high effort. Alternatively, the substrate described herein comprising the OEL described herein may be in the form of a transfer foil, which can be applied to a document or to an article in a separate transfer step. For this purpose, the substrate is provided with a release coating, on which the OEL are produced as described herein. One or more adhesive layers may be applied over the so produced OEL.

Also described herein are substrates comprising more than one, i.e. two, three, four, etc. optical effect layers (OEL) obtained by the process described herein.

Also described herein are articles, in particular security documents, decorative elements or objects, comprising the optical effect layer (OEL) produced according to the present invention. The articles, in particular security documents, decorative elements or objects, may comprise more than one (for example two, three, etc.) OELs produced according to the present invention.

As mentioned hereabove, the optical effect layer (OEL) produced according to the present invention may be used for decorative purposes as well as for protecting and authenticating a security document. Typical examples of decorative elements or objects include without limitation luxury goods, cosmetic packaging, automotive parts, electronic/electrical appliances, furniture and fingernail lacquers.

Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evidence labels and seals. It is pointed out that the disclosed substrates, value documents and value commercial goods are given exclusively for exemplifying purposes, without restricting the scope of the invention.

Alternatively, the optical effect layer (OEL) may be produced onto an auxiliary substrate such as for example a security thread, security stripe, a foil, a decal, a window or a label and consequently transferred to a security document in a separate step.

EXAMPLES

Magnetic assemblies depicted in FIG. 1A-4A were used to orient non-spherical optically variable magnetic pigment particles in a printed layer of the UV-curable screen printing ink described in Table 1 so as to produce the optical effect layers (OELs) depicted in FIG. 1B-4B. The UV-curable screen printing ink was applied by hand on a black commercial paper as the substrate, using a T90 silkscreen. The paper substrate carrying the applied layer of the UV-curable screen printing ink was disposed on a magnetic-field-generating device (FIG. 1A-4A). The so-obtained magnetic orientation pattern of the non-spherical optically variable pigment particles was, partially simultaneously to the orientation step, fixed by UV-curing the printed layer comprising the pigment particles using a UV-LED-lamp from Phoseon (Type FireFlex 50×75 mm, 395 nm, 8 W/cm$^2$).

TABLE 1

| UV-curable screen printing ink: | |
|---|---|
| Epoxyacrylate oligomer | 36% |
| Trimethylolpropane triacrylate monomer | 13.5% |
| Tripropyleneglycol diacrylate monomer | 20% |
| Genorad ™ 16 (Rahn) | 1% |
| Aerosil ® 200 (Evonik) | 1% |
| Speedcure TPO-L (Lambson) | 2% |
| IRGACURE ® 500 (BASF) | 6% |
| Genocure EPD (Rahn) | 2% |
| Tego ® Foamex N (Evonik) | 2% |
| Non-spherical optically variable magnetic pigment particles (7 layers)(*) | 16.5% |

(*)gold-to-green optically variable magnetic pigment particles having a flake shape of diameter d50 about 9 μm and thickness about 1 μm, obtained from Viavi Solutions, Santa Rosa, CA.

Example 1 (FIG. 1A-1B)

The magnetic assembly used to prepare Example 1 comprised a magnetic-field generating device being a bar dipole magnet (140) being disposed between a ring-shaped dipole magnet (130) and the substrate (120) carrying the coating composition (110) comprising the non-spherical magnetic or magnetizable pigment particles as illustrated schematically in FIG. 1A.

The bar dipole magnet (140) had a length (L1) of about 30 mm, a width (L2) of about 30 mm and a thickness (L3) of about 2 mm. The North-South magnetic axis of the bar dipole magnet (140) was parallel to the substrate (120) surface. The bar dipole magnet (140) was made of NdFeB N30UH.

The ring-shaped dipole magnet (130) had an external diameter (L4) of about 24.5 mm, an internal diameter (L5) of about 15 mm and a thickness (L6) of about 2 mm. The North-South magnetic axis of the ring-shaped dipole magnet (130) was substantially perpendicular to the North-South magnetic axis of the bar dipole magnet (140) and substantially perpendicular to the substrate (120) surface. The ring-shaped dipole magnet (130) was made of NdFeB N33.

The ring-shaped dipole magnet (130) and the bar magnet (140) were in direct contact, i.e. the distance (d) between the ring-shaped dipole magnet (130) and the bar magnet (140) was about 0 mm (not shown true to scale in FIG. 1A for the clarity of the drawing). The distance (h) between the upper bar magnet dipole (140) surface and the surface of the paper substrate (120) facing the bar dipole magnet (140) was about 3 mm.

The resulting OEL produced with the magnetic assembly illustrated in FIG. 1A is shown in FIG. 1B at different viewing angles by tilting the substrate (120) between −30° and +20°.

Example 2 (FIG. 2A-2B)

The magnetic assembly used to prepare Example 2 comprised a ring-shaped dipole magnet (230) being disposed between a magnetic-field generating device being a bar dipole magnet (240) and the substrate (220) carrying the coating composition (210) comprising the non-spherical magnetic or magnetizable pigment particles as illustrated schematically in FIG. 2A.

The bar dipole magnet (240) had a length (L1) of about 30 mm, a width (L2) of about 30 mm and a thickness (L3) of about 4 mm. The North-South magnetic axis of the bar dipole magnet (240) was substantially parallel to the substrate (220) surface. The bar dipole magnet (240) was made of NdFeB N30UH.

The ring-shaped dipole magnet (230) had an external diameter (L4) of about 24.5 mm, an internal diameter (L5) of about 15 mm and a thickness (L6) of about 2 mm and was made of NdFeB N33.

The ring-shaped dipole magnet (230) and the bar dipole magnet (240) were in direct contact, i.e. the distance (d) between (230) and (240) was about 0 mm (not shown true to scale in FIG. 2A for the clarity of the drawing). The distance (h) between the upper ring-shaped dipole magnet (230) surface and the surface of the paper substrate (220) facing the bar dipole magnet (240) was about 5 mm.

The resulting OEL produced with the magnetic assembly illustrated in FIG. 2A is shown in FIG. 2B at different viewing angles by tilting the substrate (220) between −30° and +20°.

Example 3 (FIG. 3A-3B)

The magnetic assembly used to prepare Example 3 comprised a magnetic-field generating device being a bar dipole magnet (340) being disposed between a triangular loop-shaped magnetic device (330) comprising three dipole magnets arranged in a triangular loop-shaped arrangement, and the substrate (320) carrying the coating composition comprising the non-spherical magnetic or magnetizable pigment particles as illustrated schematically in FIG. 3A.

The bar dipole magnet (340) had a length (L1) of about 30 mm, a width (L2) of about 30 m and a thickness (L3) of about 2 mm. The North-South magnetic axis of the bar dipole magnet (340) was substantially parallel to the substrate (320) surface. The bar dipole magnet (340) was made of NdFeB N30UH.

Each of the three dipole magnets arranged in a triangular loop-shaped arrangement and forming the triangular loop-shaped magnetic device (330) had a length (L4) of about 20 mm, a width (L5) of about 5 mm and a thickness (L6) of about 2 mm. The North-South magnetic axis of each of the three dipole magnets of the triangular loop-shaped magnetic device (330) was substantially perpendicular to the substrate (320) surface. The three dipole magnets were made of NdFeB N45.

The triangular loop-shaped magnetic device (330) and the bar dipole magnet (340) were in direct contact, i.e. the distance (d) between the triangular loop-shaped magnetic device (330) and the bar dipole magnet (340) was about 0 mm (not shown true to scale in FIG. 3A for the clarity of the drawing). The distance (h) between the upper bar dipole magnet (340) surface and the surface of the paper substrate (320) facing the bar dipole magnet (3440) was about 3 mm.

The resulting OEL produced with the magnetic assembly illustrated in FIG. 3A is shown in FIG. 3B at different viewing angles by tilting the substrate (320) between −10° and +40°.

Example 4 (FIG. 4A-4B)

The magnetic assembly used to prepare Example 4 comprised a bar dipole magnet (440) being disposed between a square loop-shaped magnetic device (430) made of four dipole magnets arranged in a square-shaped arrangement, and a substrate (420) carrying the coating composition (410) comprising the non-spherical magnetic or magnetizable pigment particles as illustrated schematically in FIG. 3A.

The bar dipole magnet (440) had a length (L1) of about 30 mm, a width (L2) of about 30 mm and a thickness (L3) of about 4 mm. The North-South magnetic axis of the bar dipole magnet (440) was substantially parallel to the substrate (420) surface. The bar dipole magnet (440) was made of NdFeB N30UH.

Each of the four dipole magnets arranged in a square-shaped arrangement forming the square loop-shaped magnetic device (430) had a length (L4) of about 10 mm, a width (L5) of about 5 mm and a thickness (L6) of 2 about mm. The North-South magnetic axis of each of the four dipole magnets of the square loop-shaped magnetic device (430) was substantially perpendicular to the substrate (420) surface. The four dipole magnets were made of NdFeB N45.

The square loop-shaped magnetic device (430) and the bar dipole magnet (440) were in direct contact, i.e. the distance (d) between the square loop-shaped magnetic device (430) and the bar dipole magnet (440) was about 0 mm (not shown true to scale in FIG. 4A for the clarity of the drawing). The distance (h) between the upper square loop-shaped magnetic device (430) surface and the surface of the paper substrate (420) facing the bar dipole magnet (440) was about 3 mm.

The resulting OEL produced with the magnetic assembly illustrated in FIG. 4A is shown in FIG. 4B at different viewing angles by tilting the substrate (420) between −30° and +20°.

The invention claimed is:
1. A process for producing an optical effect layer (OEL) on a substrate, said process comprising the steps of:
   a) applying on a substrate surface a radiation curable coating composition comprising non-spherical magnetic or magnetizable pigment particles, said radiation curable coating composition being in a first state,
   b) exposing the radiation curable coating composition to a resulting magnetic field of a magnetic assembly comprising
      i) a loop-shaped magnetic-field generating device being either a single loop-shaped dipole magnet having a North-South magnetic axis substantially perpendicular to the substrate surface or a combination of two or more dipole magnets disposed in a loop-shaped arrangement and having a resulting North-South magnetic axis substantially perpendicular to the substrate surface, and
      ii) a magnetic-field generating device being either a single bar dipole magnet having a North-South magnetic axis substantially parallel to the substrate surface or a combination of two or more bar dipole magnets having a resulting North-South magnetic axis substantially parallel to the substrate surface,
   so as to orient at least a part of the non-spherical magnetic or magnetizable pigment particles, and
   c) at least partially curing the radiation curable coating composition of step b) to a second state so as to fix the non-spherical magnetic or magnetizable pigment particles in their adopted positions and orientations,
   wherein the loop-shaped magnetic-field generating device and the magnetic-field generating device are in direct contact,
   wherein the resulting magnetic field results from an interaction between the loop-shaped magnetic-field generating device and the magnetic-field generating device, and
   wherein the optical effect layer provides an optical impression of a loop-shaped body having a size that varies upon tilting the optical effect layer.

2. The process according to claim 1, wherein step a) is carried out by a printing process.

3. The process according to claim 2, the printing process selected from the group consisting of screen printing, rotogravure printing and flexography printing.

4. The process according to claim 1, wherein at least a part of the plurality of non-spherical magnetic or magnetizable particles is constituted by non-spherical optically variable magnetic or magnetizable pigment particles.

5. The process according to claim 4, wherein the optically variable magnetic or magnetizable pigments are selected from the group consisting of magnetic thin-film interference pigments, magnetic cholesteric liquid crystal pigments and mixtures thereof.

6. The process according to claim 1, wherein c) is carried out partially simultaneously with the step b).

7. The process according to claim 1, wherein the non-spherical magnetic or magnetizable particles are platelet-shaped pigment particles, and wherein said process further comprises a step of exposing the radiation curable coating composition to a dynamic magnetic field of a first magnetic-field-generating device so as to bi-axially orient at least a part of the platelet-shaped magnetic or magnetizable pigment particles, said step being carried out after step a) and before step b).

8. An optical effect layer (OEL) produced by the process recited in claim 1.

9. A security document or a decorative element or object comprising one or more optical effect layer (OEL) recited in claim 8.

10. The process according to claim 1, wherein the loop-shaped magnetic-field generating device and the magnetic-field generating device are arranged one on top of the other.

11. The process according to claim 1, wherein the loop-shaped magnetic-field generating device has a side extending in a radial direction of the loop-shape that is longer than a side extending in an axial direction of the loop-shape.

12. The process according to claim 11, wherein an entirety of the side of the loop-shaped magnetic-field generating device extending in a radial direction of the loop shape is in direct contact with the magnetic-field generating device.

13. The process according to claim 1, wherein the optical effect layer provides an optical impression of a loop-shaped body surrounding one central dark area, the loop-shaped body having a size that varies upon tilting the optical effect layer.

* * * * *